US012607740B2

(12) United States Patent　　　　(10) Patent No.:　US 12,607,740 B2
Tanigawa et al.　　　　　　　　　　(45) Date of Patent:　　　Apr. 21, 2026

(54) ESTIMATION METHOD, ESTIMATION SYSTEM, AND RECORDING MEDIUM

(71) Applicant: Panasonic Intellectual Property Corporation of America, Torrance, CA (US)

(72) Inventors: Risako Tanigawa, Kanagawa (JP); Yasunori Ishii, Osaka (JP); Kazuki Kozuka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 17 days.

(21) Appl. No.: 18/650,500

(22) Filed: Apr. 30, 2024

(65) Prior Publication Data

US 2024/0280695 A1　　Aug. 22, 2024

Related U.S. Application Data

(63) Continuation　　of　　application　　No. PCT/JP2022/031730, filed on Aug. 23, 2022.

(30) Foreign Application Priority Data

Nov. 16, 2021　　(JP) ................................. 2021-186606

(51) Int. Cl.
*G01S 15/89*　　　(2006.01)
*G06V 40/20*　　　(2022.01)
*G08B 21/04*　　　(2006.01)

(52) U.S. Cl.
CPC .............. *G01S 15/89* (2013.01); *G06V 40/20* (2022.01); *G08B 21/0423* (2013.01); *G08B 21/043* (2013.01); *G08B 21/0438* (2013.01)

(58) Field of Classification Search
CPC ......... G01S 15/89; G01S 15/04; G06V 40/20; G06V 20/52; G08B 21/0423;
(Continued)

(56) References Cited

U.S. PATENT DOCUMENTS

2017/0300124 A1　10/2017　Tashev et al.
2020/0077184 A1　　3/2020　Mizuno
(Continued)

FOREIGN PATENT DOCUMENTS

JP　　　2005-309965　　　11/2005
JP　　　2006-81771　　　3/2006
(Continued)

OTHER PUBLICATIONS

International Search Report issued Nov. 22, 2022 in International (PCT) Application No. PCT/JP2022/031730.
(Continued)

*Primary Examiner* — An T Nguyen
(74) *Attorney, Agent, or Firm* — Wenderoth, Lind & Ponack, L.L.P.

(57) ABSTRACT

An estimation method includes obtaining first sound information regarding a reflected sound resulted from reflection of a transmission sound in an inaudible band inside a facility, and outputting image information indicating a living body presence area in which a living body is present, by inputting the first sound information obtained to a first trained model trained using sound information regarding the reflected sound and an image indicating the living body presence area.

20 Claims, 21 Drawing Sheets

(58) Field of Classification Search
CPC .............. G08B 21/043; G08B 21/0438; G08B
21/0469; A61B 5/00; G06Q 10/04; G06Q
50/10; G06T 7/00; G06T 7/20
See application file for complete search history.

(56) References Cited

U.S. PATENT DOCUMENTS

| | | |
|---|---|---|
| 2021/0199751 A1 | 7/2021 | Qiu et al. |
| 2023/0114470 A1* | 4/2023 | Guo ..................... G06V 10/751 |
| | | 702/189 |

FOREIGN PATENT DOCUMENTS

| | | |
|---|---|---|
| JP | 2019-66378 | 4/2019 |
| JP | 2019-95517 | 6/2019 |
| JP | 2020-34542 | 3/2020 |
| WO | 2020/041563 | 2/2020 |

OTHER PUBLICATIONS

Irie, Go et al., "Seeing Through Sounds: Predicting Visual Semantic Segmentation Results from Multichannel Audio Signals", ICASSP 2019—2019 IEEE International Conference on Acoustics, Speech and Signal Processing (ICASSP), pp. 3961-3964.

* cited by examiner

Example of first sound information Is1

Another example of first sound information Is1

| Input data | Training data |
|---|---|
| Training sound information Ls | Training image Lm |

| Input data | Training data |
|---|---|
| Training image information Li | Training behavior information La |
| | Walking |
| ⋮ | Falling down |
| ⋮ | Meal preparation |

Example of second sound information Is2

FIG. 20
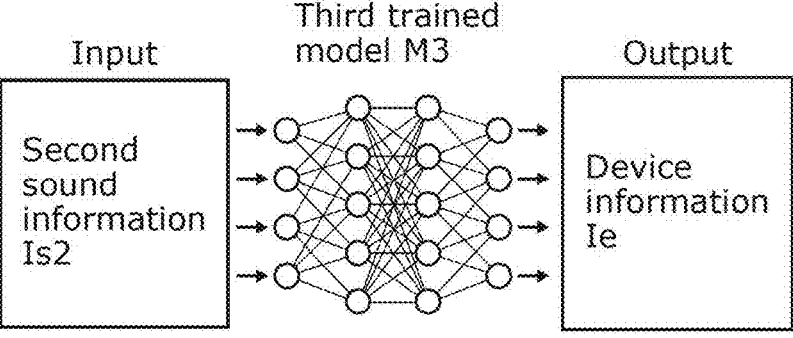
Input     Third trained model M3     Output
Second sound information Is2     Device information Ie
FIG. 21
| Input data | Training data |
|---|---|
| Training sound information Ls | Training device information Le |
| | Vacuum cleaner |
| ⋮ | Hair dryer |
FIG. 22
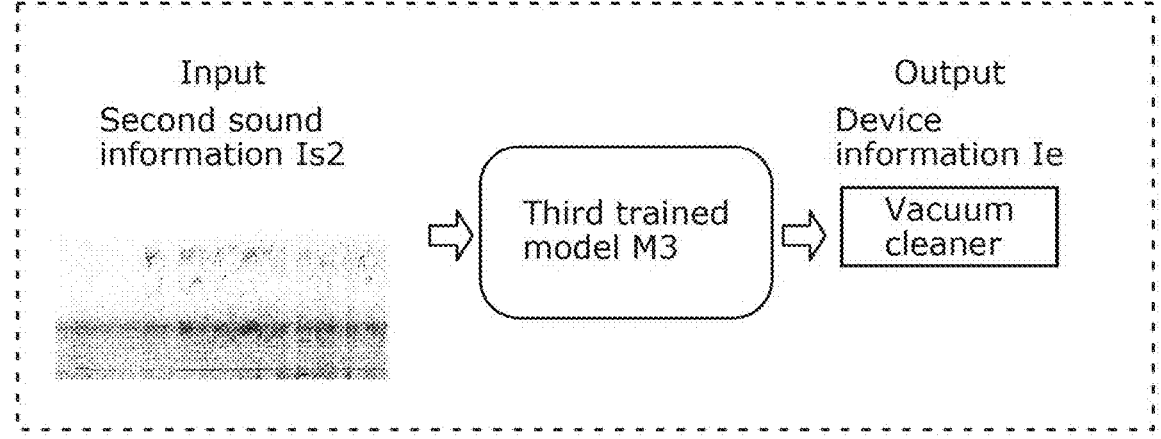
Input
Second sound information Is2
Third trained model M3
Output
Device information Ie
Vacuum cleaner Cook with microwave oven FIG. 32
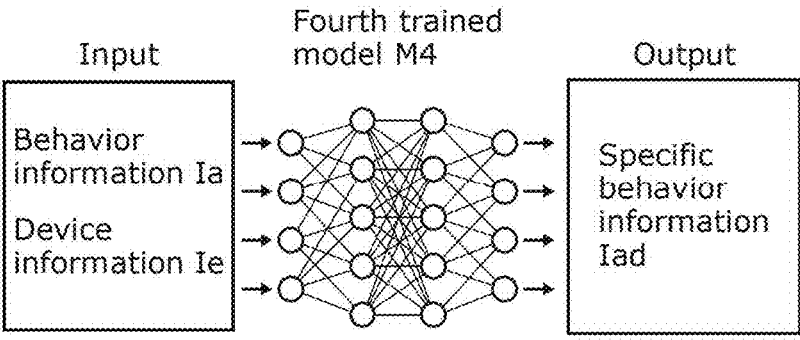
FIG. 33
| Input data | | Training data |
|---|---|---|
| Training behavior information La | Training device information Le | Training specific behavior information Lad |
| Meal preparation | Microwave oven | Cook with microwave oven |
| Meal preparation | Blender | Blend with blender |
| Meal preparation | Electric kettle | Boil water with electric kettle |
FIG. 34
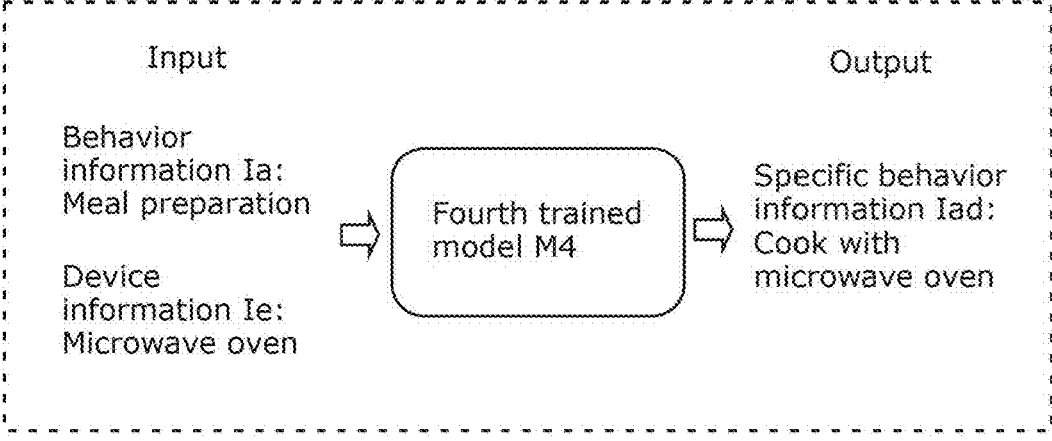

ESTIMATION METHOD, ESTIMATION SYSTEM, AND RECORDING MEDIUM

CROSS REFERENCE TO RELATED APPLICATIONS

This is a continuation application of PCT International Application No. PCT/JP2022/031730 filed on Aug. 23, 2022, designating the United States of America, which is based on and claims priority of Japanese Patent Application No. 2021-186606 filed on Nov. 16, 2021. The entire disclosures of the above-identified applications, including the specifications, drawings and claims are incorporated herein by reference in their entirety.

FIELD

The present disclosure relates to an estimation method, an estimation system, and a recording medium that estimate a living body.

BACKGROUND

Devices for estimating the behavior of a person inside a facility are conventionally known. As an example of this kind of device, Japanese Unexamined Patent Application Publication No. 2005-309965 discloses an in-home security device for estimating the behavior of a person from information obtained from a camera that captures an image of an in-home state, an infrared sensor that detects the motion of a person at home, and a microphone that detects an ambient sound inside the home.

CITATION LIST

Patent Literature

PTL 1: Japanese Unexamined Patent Application Publication No. 2005-309965

SUMMARY

Technical Problem

The present disclosure provides an estimation method, an estimation system, and a recording medium that can estimate a living body while protecting privacy and even when the living body is not emitting a sound.

Solution to Problem

An estimation method according to one aspect of the present disclosure is an estimation method for estimating a living body inside a facility. The estimation method includes obtaining first sound information regarding a reflected sound resulted from reflection of a transmission sound in an inaudible band inside the facility, and outputting image information indicating a living body presence area in which the living body is present, by inputting the first sound information obtained in the obtaining of the first sound information to a first trained model trained using sound information regarding the reflected sound and an image indicating the living body presence area.

An estimation system according to another aspect of the present disclosure is an estimation system that estimates a living body inside a facility. The estimation system includes a first sound information obtainer that obtains first sound information regarding a reflected sound resulted from reflection of a transmission sound in an inaudible band inside the facility, and a living body presence area estimator that outputs image information indicating a living body presence area in which the living body is present, by inputting the first sound information obtained by the first sound information obtainer to a first trained model trained using sound information regarding the reflected sound and an image indicating the living body presence area.

A recording medium according to still another aspect of the present disclosure is a non-transitory computer-readable recording medium having recorded thereon a program for causing a computer to execute the above-mentioned estimation method.

It should be noted that a general or specific aspect of the present disclosure may be embodied as a system, a method, an integrated circuit, a computer program, or a computer-readable recording medium, such as a CD-ROM, or may be embodied as any combination of the system, method, integrated circuit, computer program, and recording medium.

Advantageous Effects

It is possible to estimate a living body while protecting privacy and even when the living body is not emitting a sound.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 20 illustrates a third trained model used by the currently used device estimator of the behavior estimation device.

FIG. 21 illustrates input data and training data for use in generating the third trained model.

FIG. 22 illustrates an example of the second sound information input to the third trained model and an example of device information output from the third trained model in the currently used device estimator.

FIG. 32 illustrates a fourth trained model used in Variation 1 of Embodiment 3.

FIG. 33 illustrates input data and training data for use in generating the fourth trained model.

FIG. 34 illustrates examples of device information and behavior information input to the fourth trained model and an example of specific behavior information output from the fourth trained model in a specific-behavior outputter.

DESCRIPTION OF EMBODIMENTS

Figure 1:
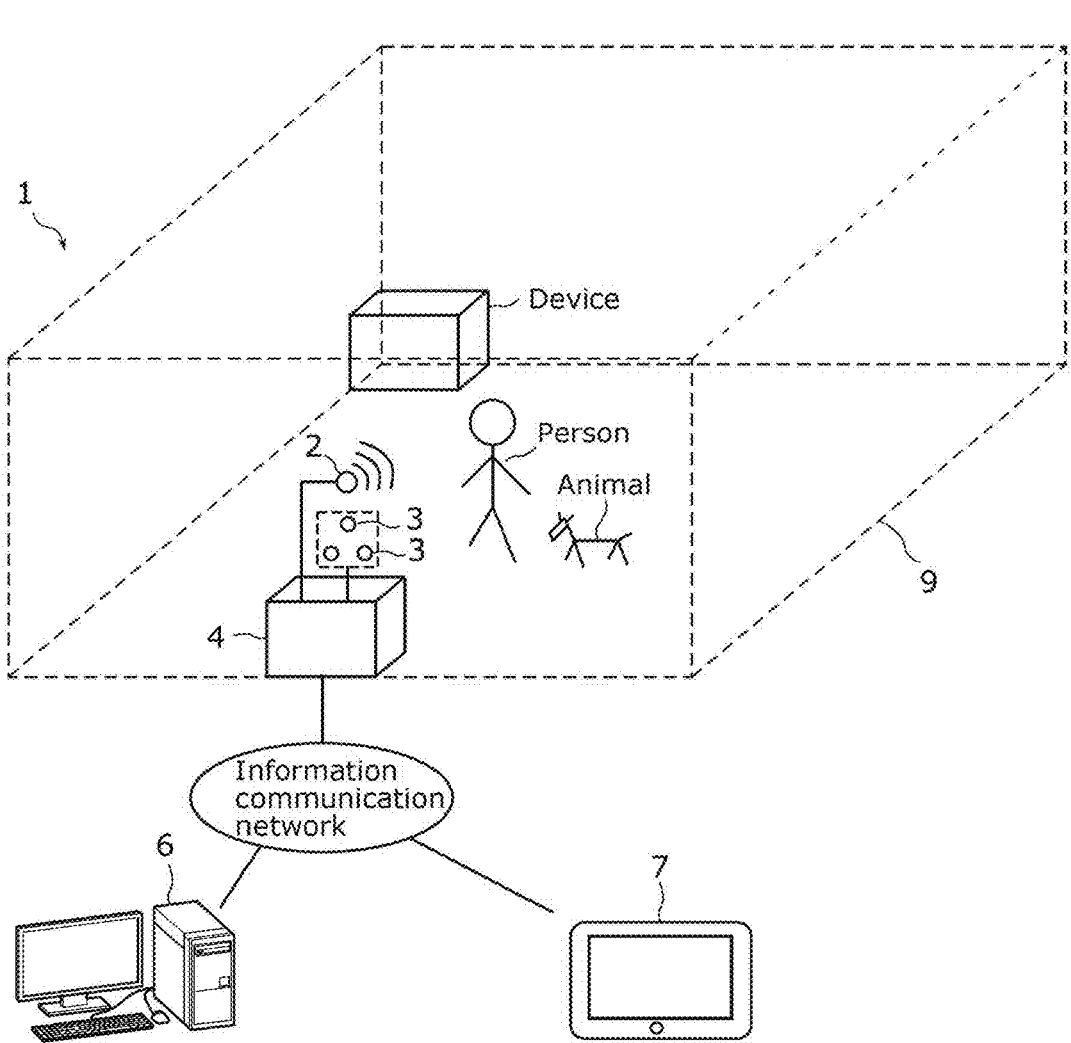
FIG. 1 illustrates an estimation system according to Embodiment 1.

Providing a service according the movement of a person by estimating the person's behavior from information detected by a sensor has become common. Although sometimes a camera is used as a sensor, capturing an image of a person with a camera may raise the issue of privacy violation. A method of estimating the behavior of a person from a sound detected inside a facility is also known. However, in this method, it is difficult to estimate the behavior of the person when the person is not emitting a sound. In view of this, the present disclosure provides an estimation method, an estimation system, and a recording medium that can estimate a living body, such as a person, while protecting privacy and even when the living body is not emitting a sound.

An estimation method according to one aspect of the present disclosure is an estimation method for estimating a living body inside a facility. The estimation method includes obtaining first sound information regarding a reflected sound resulted from reflection of a transmission sound in an inaudible band inside the facility, and outputting image information indicating a living body presence area in which the living body is present, by inputting the first sound information obtained in the obtaining of the first sound information to a first trained model trained using sound information regarding the reflected sound and an image indicating the living body presence area.

In the estimation method, the image information indicating the living body presence area is output on the basis of the first sound information regarding the reflected sound resulted from reflection of the transmission sound in the inaudible band. Thus, by referring to the output image information, it is possible to grasp living body information while protecting privacy. Furthermore, in the estimation method, the image information indicating the living body presence area is output on the basis of the reflected sound resulted from reflection of the transmission sound. Thus, it is possible to estimate the state of the living body even when the living body is not emitting a sound.

The estimation method may further include outputting behavior information indicating the behavior of the living body inside the facility, by inputting the image information output in the outputting of the image information to a second trained model trained using the image information indicating the living body presence area and behavior information indicating a behavior of the living body.

Since the behavior information on the living body is output on the basis of the image information, it is possible to estimate the behavior of the living body while protecting privacy. Since the behavior information on the living body is output on the basis of the image information, it is possible to estimate the behavior of the living body even when the living body is not emitting a sound.

Furthermore, the first sound information may include at least one of the signal waveform of the reflected sound or an image indicating the direction from which the reflected sound is coming.

In this way, the first sound information can be readily generated in the obtaining of the first sound information. This means that the image information indicating the living body presence area, based on the first sound information can be readily output and the information based on the image information can be readily output. Accordingly, it is possible to readily estimate the living body.

Furthermore, the image information to be input to the second trained model in the outputting of the behavior information may include image frames.

In this way, the amount of the image information input to the second trained model can be increased. This can improve the accuracy of the behavior information output from the second trained model. Accordingly, it is possible to improve the accuracy of estimating the behavior of the living body.

Furthermore, in the outputting of the behavior information, the total number of the image frames to be input to the second trained model is determined based on a difference in the total number of pixels included in the living body presence area between two chronologically consecutive image frames out of the image frames.

This can make the amount of the image information input to the second trained model an appropriate amount of data. This can make the amount of data processed by the second trained model an appropriate amount, which can reduce the amount of data processing necessary to estimate the behavior of the living body.

The estimation method may further include selecting an image frame to be reinput to the second trained model from among the image frames, when the behavior information output in the outputting of the behavior information does not match the behavior information used when training the second trained model. In the selecting, two or more image frames may be selected, the two or more image frames being image frames in which a difference in the total number of pixels included in the living body presence area between two chronologically consecutive image frames out of the image frames is smaller than a predetermined threshold, and in the outputting of the behavior information, the two or more image frames selected in the selecting may be reinput to the second trained model, to output the behavior information corresponding to the two or more image frames reinput.

In this way, even when for instance the image frames input to the second trained model include noise, it is possible to remove image frames including the noise and output the behavior information on the living body. Accordingly, it is possible to improve the accuracy of estimating the behavior of the living body.

The estimation method may further include notifying the behavior information output in the outputting of the behavior information.

In this way, the behavior information on the living body can be externally notified.

The estimation method may further include displaying the behavior information notified in the notifying of the behavior information.

In this way, the behavior of the living body can be visually notified.

When the behavior included in the behavior information is an abnormal behavior, the image information output in the outputting of the image information may be further notified in the notifying of the behavior information.

In this way, the behavior of the living body can be externally notified in detail by notifying the image information when the behavior of the living body is abnormal. This makes it possible to watch over the behavior of the living body.

Furthermore, the abnormal behavior may include at least one of falling down, falling off, walking with difficulty, getting burned, or accidental swallowing.

In this way, when the behavior information includes at least one of falling down, falling off, walking with difficulty, getting burned, or accidental swallowing, the behavior of the living body can be externally notified in detail. This makes it possible to watch over the behavior of the living body.

The estimation method may further include obtaining second sound information regarding an environmental sound other than the reflected sound among environmental sounds inside the facility, and outputting device information indicating a device being used inside the facility, by inputting the second sound information obtained in the obtaining of the second sound information to a third trained model trained using sound information regarding an environmental sound other than the reflected sound and device information indicating a device that can be used inside the facility.

In the estimation method, the device information is output on the basis of the second sound information regarding the environmental sound other than the reflected sound. Thus, it is possible to estimate the device being used inside the facility and the behavior of the living body, while protecting privacy.

Furthermore, the second sound information may include a spectrogram image indicating the frequency and power of the environmental sound.

In this way, the second sound information can be readily generated in the obtaining of the second sound information. This means that the device information based on the second sound information can be readily output and the device being used inside the facility can be readily estimated.

The estimation method may further include determining whether the behavior of the living body is abnormal, based on the behavior information output in the outputting of the behavior information and the device information output in the outputting of the device information, and notifying the device information output in the outputting of the device information and the behavior information output in the outputting of the behavior information, when the behavior of the living body is determined to be abnormal in the determining of whether the behavior of the living body is abnormal.

In this way, it is possible to improve the accuracy of determination as to whether the behavior of the living body is abnormal, by determining whether the behavior of the living body is abnormal on the basis of the behavior information and the device information. Furthermore, when the behavior of the living body is abnormal, the behavior information on the living body can be externally notified.

When the behavior of the living body is determined to be abnormal in the determining of whether the behavior of the living body is abnormal, the image information output in the outputting of the image information may be further notified in the notifying of the device information and the behavior information.

In this way, the behavior of the living body can be externally notified in detail by notifying the image information when the behavior of the living body is abnormal. This makes it possible to watch over the behavior of the living body.

Furthermore, the second sound information may include information regarding the direction from which the environmental sound other than the reflected sound is coming, and the third trained model may be generated by training using the sound information and the device information, the sound information including information regarding the direction from which the environmental sound other than the reflected sound is coming, the device information indicating the device that can be used inside the facility.

In this way, since the second sound information includes the information regarding the direction from which the environmental sound other than the reflected sound is coming, it is possible to improve the accuracy of estimating the device being used inside the facility.

The estimation method may further include determining whether the living body is present in the direction from which the environmental sound is coming, based on the image information output in the outputting of the image information and the information regarding the direction from which the environmental sound is coming obtained in the obtaining of the second sound information, when a device included in the device information is a device that requires continuous operation by the living body to work, and outputting information indicating that the device is in abnormal use, when the living body is determined not to be present in the direction in the determining of whether the living body is present in the direction.

In this way, by determining whether the living body is present in the direction from which the environmental sound is coming, it is possible to determine whether the device is in abnormal use. Thus, it is possible to estimate the behavior of the living body, which also tells whether the device is in abnormal use. Furthermore, when the device is in abnormal use, information indicating that the device is in abnormal use can be externally notified.

The estimation method may further include outputting specific behavior information in which the behavior included in the behavior information is further detailed based on the device information output in the outputting of the device information and the behavior information output in the outputting of the behavior information.

In this way, by estimating the behavior of the living body using the behavior information and the device information, it is possible to estimate the specific behavior of the living body.

Furthermore, in the outputting of the specific behavior information, the specific behavior information may be output by inputting, to a fourth trained model, the device information output in the outputting of the device information and the behavior information output in the outputting of the behavior information, the fourth trained model being trained using the device information, the behavior information, and the specific behavior information.

In this way, by estimating the behavior of the living body using the behavior information and the device information, it is possible to estimate the specific behavior of the living body.

An estimation system according to an embodiment of the present disclosure is an estimation system that estimates a living body inside a facility. The estimation system includes a first sound information obtainer that obtains first sound information regarding a reflected sound resulted from reflection of a transmission sound in an inaudible band inside the facility, and a living body presence area estimator that outputs image information indicating a living body presence area in which the living body is present, by inputting the first sound information obtained by the first sound information obtainer to a first trained model trained using sound information regarding the reflected sound and an image indicating the living body presence area.

The estimation system outputs the image information indicating the living body presence area on the basis of the first sound information regarding the reflected sound resulted from reflection of the transmission sound in the inaudible band. Thus, by referring to the output image information, the estimation system can grasp living body information while protecting privacy. Furthermore, the estimation system outputs the image information indicating the living body presence area, on the basis of the reflected sound resulted from reflection of the transmission sound. Thus, the estimation system can estimate the state of the living body even when the living body is not emitting a sound.

The estimation system may further include an ultrasonic transmitter that transmits the transmission sound, and a microphone that receives the reflected sound.

In this configuration, the first sound information obtainer can readily obtain the first sound information. This means that the image information indicating the living body presence area, based on the first sound information can be readily output and the living body information based on the image information can be readily output. Accordingly, it is possible to readily estimate the living body.

A recording medium according to an embodiment of the present disclosure is a non-transitory computer-readable recording medium having recorded thereon a program for causing a computer to execute the above-mentioned estimation method.

By using the recording medium, it is possible to provide the estimation method for estimating a living body while protecting privacy and even when the living body is not emitting a sound.

An estimation method, an estimation system, and a recording medium according to aspects of the present disclosure are described below in detail with reference to the figures.

It should be noted that the embodiments described below show specific examples of the present disclosure. The numerical values, shapes, materials, structural elements, arrangement and connection of the structural elements, steps, order of the steps are mere examples and do not intend to limit the present disclosure. Furthermore, among the structural elements described in the embodiments below, those not recited in the independent claims representing superordinate concepts are described as optional structural elements.

Embodiment 1

[1.1 Configuration of Estimation System]

An estimation system according to Embodiment 1 is described with reference to FIGS. 1 to 12.

FIG. 1 illustrates estimation system 1 according to Embodiment 1.

Estimation system 1 according to Embodiment 1 is a system that estimates the behavior of a person inside facility 9. By estimating the behavior of the person, it is possible to, for example, watch over the behavior of the user of facility 9 or manage the person's health.

Facility 9 is a building used by people, and examples of facility 9 include a house, an apartment, a hospital ward, a care facility, and accommodation. The inside of facility 9 includes usable spaces, such as a room, a floor, and a hall. A user of facility 9 and an animal, such as a pet, are present inside facility 9. In Embodiment 1, a person and an animal are collectively referred to as a living body. Furthermore, a living body that is the target of behavior estimation in Embodiment 1 is not limited to one living body, and living bodies may be the targets of behavior estimation. In the example described below, a living body is a person, and the behavior of the person is estimated.

The behaviors of the person estimated by the system are classified into normal behaviors and abnormal behaviors. The normal behaviors are daily behaviors or behaviors that do not involve abnormalities, such as walking, sleeping, meal preparation, cleaning, having a meal, watching TV, and working. The abnormal behaviors are unexpected behaviors or behaviors resulting from a careless mistake, such as falling down, falling off, walking with difficulty, getting burned, and accidental swallowing.

Figure 2:
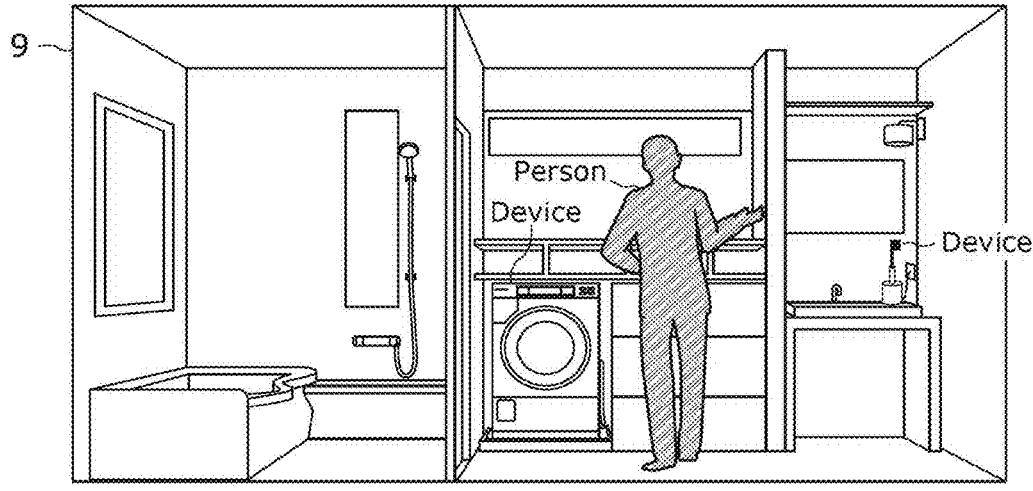
FIG. 2 illustrates an example of a facility used by a person whose behavior is to be estimated.

FIG. 2 illustrates an example of facility 9 used by a person whose behavior is to be estimated.

Devices such as a washing machine and an electric toothbrush are provided inside facility 9 in FIG. 2. It should be noted that the devices provided inside facility 9 may include automatic electric devices, such as a washing machine, a microwave oven, a refrigerator, and a dishwasher, and electric devices that require continuous human operation to work, such as an electric toothbrush, an electric shaver, a hair dryer, and a cooking heater. Various environmental sounds are output from these devices according to the usage status of each device. The environmental sounds are explained in another embodiment described later.

Figure 3:
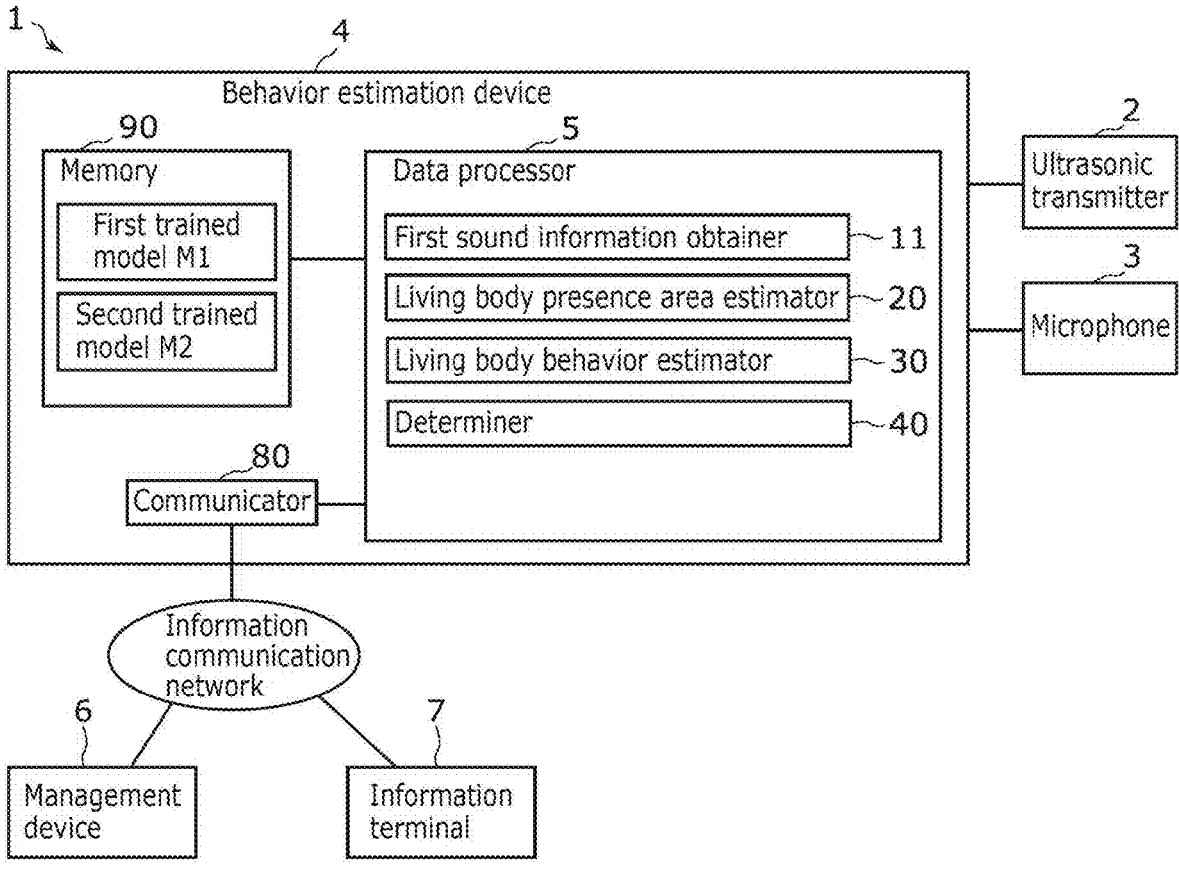
FIG. 3 is a block diagram illustrating the estimation system according to Embodiment 1 and a functional configuration of the behavior estimation device of the estimation system.

FIG. 3 is a block diagram illustrating estimation system 1 and a functional configuration of behavior estimation device 4 of estimation system 1.

Estimation system 1 includes ultrasonic transmitter 2, microphone 3, and behavior estimation device 4. Estimation system 1 further includes management device 6 and information terminal 7.

Management device 6 is provided outside facility 9 and communicably connected to behavior estimation device 4 via an information communication network. Management device 6 is, for example, a computer and is provided in a building where a security management company is located. Management device 6 is a device for checking the safety of a user of facility 9 and is notified of, for example, behavior information indicating a person's behavior estimated by behavior estimation device 4.

Information terminal 7 is communicably connected to behavior estimation device 4 via the information communication network. Information terminal 7 is, for example, a smartphone or a tablet terminal portable by a person. Various information items obtained by behavior estimation device 4 are transmitted to information terminal 7, which then displays the various information items transmitted by behavior estimation device 4. The possessor of information terminal 7 may be a user of facility 9 or a person who does not pose a problem in terms of privacy, such as a caregiver or a guardian of the user of facility 9.

Ultrasonic transmitter 2 is an ultrasonic sonar that transmits an ultrasonic wave as a transmission sound. Ultrasonic transmitter 2 transmits, for example, a sound wave having a frequency of at least 20 kHz and at most 100 kHz. The signal waveform of a sound transmitted from ultrasonic transmitter 2 may be a burst waveform or a chirp waveform. In Embodiment 1, a sound of a burst waveform where one cycle is 50 ms is continuously output from ultrasonic transmitter 2.

Ultrasonic transmitter 2 is, for example, attached to a wall of facility 9 and transmits an ultrasonic wave across the entire room. Furthermore, when estimation system 1 is in the setting mode to estimate the behavior of a person, ultrasonic transmitter 2 constantly transmits ultrasonic waves. A transmission sound transmitted from ultrasonic transmitter 2 is reflected on a person in the room and becomes a reflected sound, which is then picked up by microphone 3.

Microphone 3 is attached to a wall in facility 9 and receives or picks up the reflected sound. For instance, microphone 3 is attached to the wall to which ultrasonic transmitter 2 is attached. Microphone 3 is, for example, a microphone array including three or more MEMS microphones. When the number of microphones 3 is three, three microphones 3 are disposed at the respective vertices of a triangle. To readily detect reflected sounds in a vertical direction and in a horizontal direction inside facility 9, four or more microphones 3 may be arranged in the vertical direction, and four or more other microphones 3 may be arranged in the horizontal direction. By receiving the reflected sound, microphone 3 generates a received-sound signal and outputs the received-sound signal to behavior estimation device 4.

Thus, in Embodiment 1, since sensing is performed using ultrasonic waves, the outlines of the head, arms, legs, torso, and others of a person can be detected. However, unlike when a camera is used, for example, the face of the person cannot be identified. As such, sensing in consideration of privacy can be performed. Furthermore, in Embodiment 1, active sensing is performed using a reflected sound resulted from transmission of an ultrasonic wave. Thus, even when the person is not talking or is moving without making a sound, it is possible to sense the person. As such, even when the person is not emitting a sound, the behavior of the person can be estimated. A configuration of behavior estimation device 4 is described below.

Behavior estimation device 4 is attached to a wall, a floor, or a ceiling of facility 9. It should be noted that behavior estimation device 4 may be provided outside facility 9 without being limited to providing inside facility 9.

As illustrated in FIG. 3, behavior estimation device 4 includes data processor 5 including first sound information obtainer 11, living body presence area estimator 20, living body behavior estimator 30, and determiner 40. Behavior estimation device 4 further includes communicator 80 and memory 90. Behavior estimation device 4 is embodied as a computer including a processor. The respective structural elements of behavior estimation device 4 may be, for example, software functions implemented by the processor executing a program stored in memory 90.

A program for data processor 5 to perform data processing is stored in memory 90. Furthermore, memory 90 stores first trained model M1 and second trained model M2 for use in estimating the behavior of a person. Each trained model includes, for example, an input layer, an intermediate layer (a hidden layer), and an output layer.

First sound information obtainer 11 obtains first sound information Is1 regarding a reflected sound resulted from reflection of a transmission sound in an inaudible band inside facility 9. For instance, first sound information obtainer 11 generates first sound information Is1 by performing various data processing tasks on the received-sound signal output from microphone 3. Specifically, first sound information obtainer 11 divides the received signal per cycle into signal waveforms and takes out the signal waveforms. Moreover, first sound information obtainer 11 extracts, from the received-sound signal, the signal of a sound in the band of the transmission sound. The signal of the sound in the band of the transmission sound is extracted by filtering the received-sound signal (removing the audible band) with the use of a high-pass filter or a band elimination filter.

The sound in the band of the transmission sound is a sound in the band of ultrasonic transmitter 2 (at least 20 kHz and at most 100 kHz) and does not include a voice band. In this way, in Embodiment 1, first sound information obtainer 11 obtains the information regarding the sound in the inaudible band. Since the information regarding the sound in the inaudible band is obtained, information regarding the sound of a person's speech is not picked up. As such, it is possible to protect the privacy of the person inside facility 9.

Figure 4:
FIG. 4 illustrates an example of first sound information obtained by the first sound information obtainer of the behavior estimation device.

FIG. 4 illustrates an example of first sound information Is1 obtained by first sound information obtainer 11 of behavior estimation device 4.

FIG. 4 illustrates a signal waveform representing a burst wave. FIG. 4 illustrates the direct wave of a transmission sound transmitted from ultrasonic transmitter 2 and the reflected wave of a reflected sound resulted from reflection on a person. Since the amplitude of the reflected wave is smaller than that of the direct wave, FIG. 4 illustrates the amplified amplitude of the reflected wave. The horizontal axis of the signal waveform represents time, and the vertical axis of the signal waveform represents the amplitude.

Figure 5:
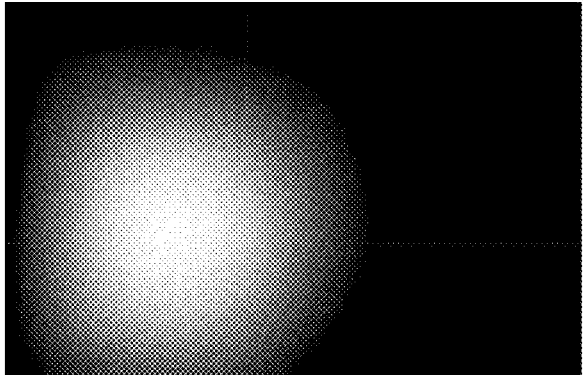
FIG. 5 illustrates another example of the first sound information obtained by the first sound information obtainer.

FIG. 5 illustrates another example of first sound information Is1 obtained by first sound information obtainer 11.

FIG. 5 shows, in shades of white and black, an image indicating the direction from which the reflected sound is coming. In FIG. 5, the white area is the area in which the reflected sound is present, and the black area is the area in which the reflected sound is not present. The image indicating the direction from which the reflected sound is coming is generated by performing delay-and-sum beamforming on the received-sound signal of the sound received using microphones 3. The horizontal axis and the vertical axis of the image indicate position coordinates in the horizontal direction and in the vertical direction, respectively, in a predetermined usable space. However, as long as the scales of images input to a trained model are the same, the coordinate axes and a scale are not necessarily needed. In the example described below, the image indicating the direction from which the reflected sound is coming is used as first sound information Is1.

First sound information Is1 obtained by first sound information obtainer 11 is output to living body presence area estimator 20.

Living body presence area estimator 20 estimates a living body presence area in which a living body, such as a person, is present. Specifically, living body presence area estimator 20 outputs image information Ii indicating the living body presence area, by inputting, to first trained model M1, first sound information Is1 output from first sound information obtainer 11.

Figure 6:
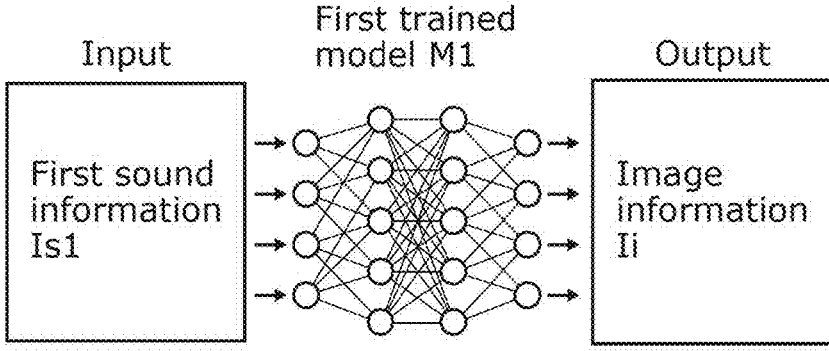
FIG. 6 illustrates a first trained model used by the living body presence area estimator of the behavior estimation device.

FIG. 6 illustrates first trained model M1 used by living body presence area estimator 20 of behavior estimation device 4.

First trained model M1 illustrated in FIG. 6 is an inference model trained using training sound information Ls regarding reflected sounds and training images Lm each indicating a living body presence area in which a person is present. First trained model M1 is generated in advance by a computer different from behavior estimation device 4. Furthermore, input data and training data for use in generating first trained model M1 are created in advance.

Figures 7, 8:
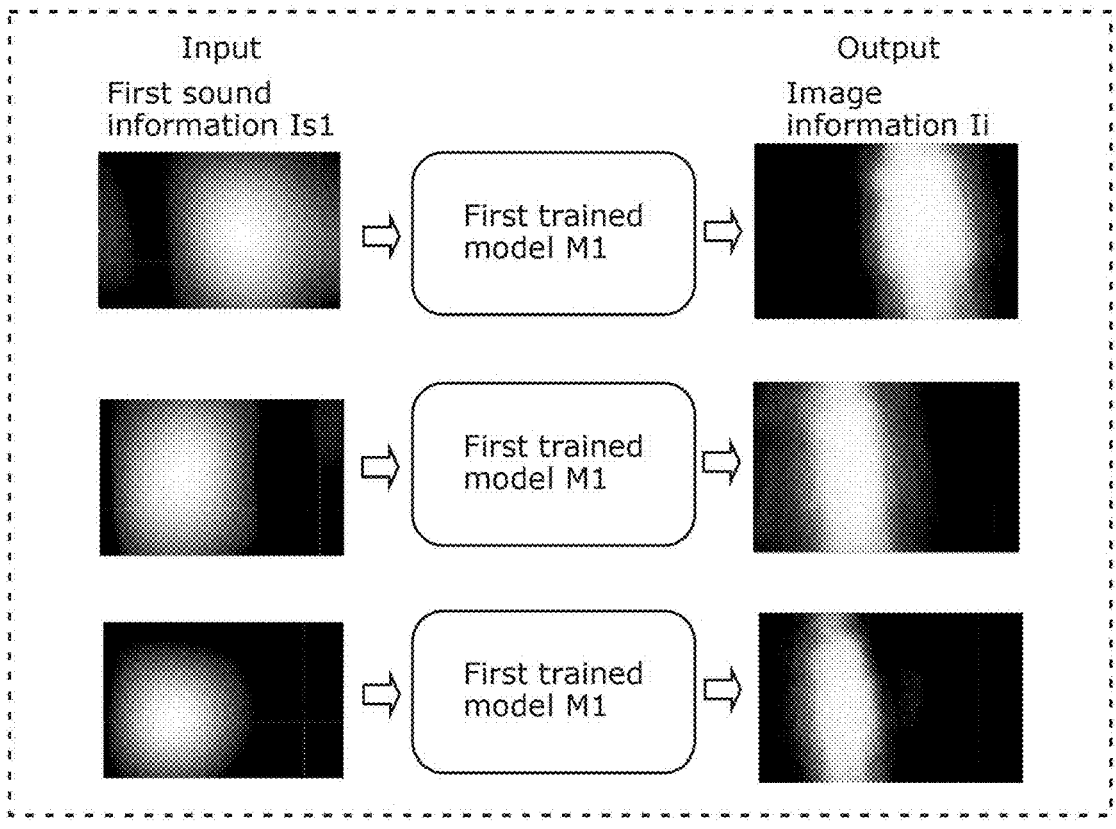
FIG. 7 illustrates input data and training data for use in generating the first trained model.
FIG. 8 illustrates examples of the first sound information input to the first trained model and examples of image information output from the first trained model in the living body presence area estimator.

FIG. 7 illustrates input data and training data for use in generating first trained model M1. FIG. 7 illustrates training sound information Ls and training images Lm in a situation in which a person is walking, changing the direction.

Images each indicating the direction from which a reflected sound is coming are used as training sound information Ls, which is the input data. Images of a person different from a user (a user of facility 9) which were captured with a camera are used as training images Lm, which are the training data. In training image Lm, the area in which a person is present is indicated by white, and the area in which a person is not present is indicated by black. An image of the person different from the user may be an image of a person with any body type, such as a person with a standard body type, a tall or short person, or an obese or thin person. It should be noted that by training the model also using time difference data on the direct wave and the reflected wave illustrated in FIG. 4, it is possible to generate the trained model reflecting not only information regarding the direction from which the reflected sound is coming but also information regarding the depth direction (direction perpendicular to both the vertical direction and the horizontal direction).

Thus, first trained model M1 is generated by machine learning using training sound information Ls and training images Lm. First trained model M1 generated in advance is stored in memory 90.

By inputting, to first trained model M1 generated in the above manner, first sound information Is1 obtained by first sound information obtainer 11, living body presence area estimator 20 outputs image information Ii indicating a living body presence area. Image information Ii indicates the position, shape, and size of the person, and an area occupied by the person in an image is shown by, for example, the brightness (luminance) of each pixel in the image.

FIG. 8 illustrates examples of first sound information Is1 input to first trained model M1 and examples of image information Ii output from first trained model M1 in living body presence area estimator 20.

As illustrated in FIG. 8, first sound information Is1 input to first trained model M1 is, for example, an image indicating the direction from which a reflected sound is coming. First sound information Is1 indicates the direction from which the reflected sound is coming, as position coordinates. In this respect, first sound information Is1 is the same type of information as training sound information Ls.

As illustrated in FIG. 8, image information Ii output from first trained model M1 is an image indicating the living body presence area in which a person is estimated to be present. In image information Ii, the living body presence area in which a person is estimated to be present is indicated by white, and the area in which a person is estimated not to be present is indicated by black. As with training image Lm, image information Ii indicates the living body presence area. However, the outline of the person in image information Ii is not as clear as the outline of the person in training image Lm. That is, image information Ii does not include information that makes it possible to identify an individual.

Thus, living body presence area estimator 20 outputs image information Ii indicating the living body presence area on the basis of first sound information Is1. Image information Ii output from living body presence area estimator 20 is output to living body behavior estimator 30. It should be noted that if first trained model M1 is a model trained using also the time difference data on the direct wave and the reflected wave, by inputting, to first trained model M1, first sound information Is1 including the time difference data on the direct wave and the reflected wave, living body presence area estimator 20 may output image information Ii inferred on the further basis of the time difference data on the direct wave and the reflected wave.

Living body behavior estimator 30 estimates the behavior of the living body such as a person. Specifically, by inputting, to second trained model M2, image information Ii output from living body presence area estimator 20, living body behavior estimator 30 outputs behavior information Ia indicating the behavior of the person.

Figures 9, 10:
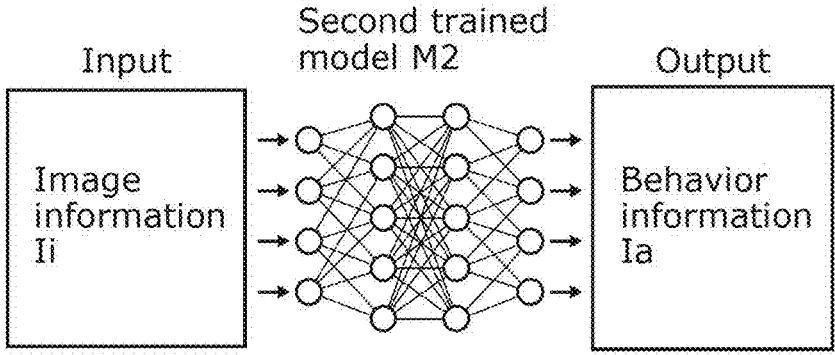
FIG. 9 illustrates a second trained model used by the living body behavior estimator of the behavior estimation device.
FIG. 10 illustrates input data and training data for use in generating the second trained model.

FIG. 9 illustrates second trained model M2 used by living body behavior estimator 30 of behavior estimation device 4.

Second trained model M2 illustrated in FIG. 9 is an inference model trained using training image information Li indicating the living body presence areas of a person and training behavior information La indicating the behaviors of the person. Second trained model M2 is generated in advance by a computer different from behavior estimation device 4. Furthermore, input data and training data for use in generating second trained model M2 are created in advance.

FIG. 10 illustrates input data and training data for use in generating second trained model M2. FIG. 10 illustrates training image information Li and training behavior information La in a situation in which a person is walking, changing the direction.

Image information Ii obtained by living body presence area estimator 20 is used as training image information Li, which is the input data. For instance, training image information Li is a video including multiple image frames. Training behavior information La, which is the training data, indicates normal behaviors, such as walking, sleeping, meal preparation, cleaning, having a meal, watching TV, and working, and abnormal behaviors, such as falling down, falling off, walking with difficulty, getting burned, and accidental swallowing.

In this way, second trained model M2 is generated by machine learning using training image information Li and training behavior information La. Second trained model M2 generated in advance is stored in memory 90.

By inputting, to second trained model M2 generated in the above manner, image information Ii output from living body presence area estimator 20, living body behavior estimator 30 outputs behavior information Ia indicating the behavior of the person.

Figure 11:
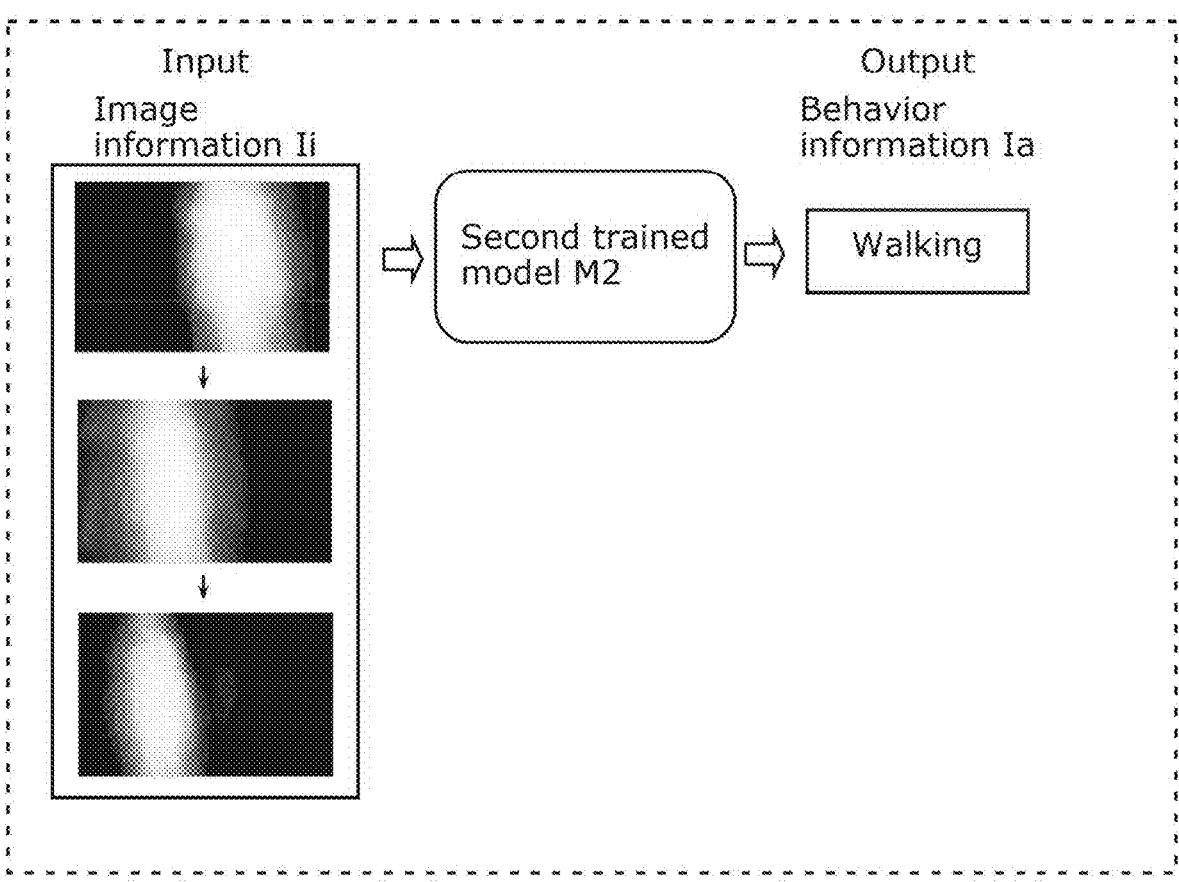
FIG. 11 illustrates an example of the image information input to the second trained model and an example of behavior information output from the second trained model in the living body presence area estimator.

FIG. 11 illustrates an example of image information Ii input to second trained model M2 and an example of behavior information Ia output from second trained model M2 in living body behavior estimator 30.

As illustrated in FIG. 11, image information Ii input to second trained model M2 includes images each indicating a living body presence area in which a person is estimated to be present. Image information Ii includes moving images including multiple image frames. However, image information Ii is not limited to moving images and may be a still image including one image frame. Image information Ii indicates the living body presence area as an image. In this respect, image information Ii is the same type of information as training image information Li.

As illustrated in FIG. 11, behavior information Ia output from second trained model M2 indicates the behavior of the person inside facility 9. Behavior information Ia indicates the behavior of the person by characters. In this respect, behavior information Ia is the same type of information as training behavior information La.

Thus, living body behavior estimator 30 outputs behavior information Ia on the person inside facility 9 on the basis of image information Ii indicating the living body presence area. Behavior information Ia output from living body behavior estimator 30 is output to determiner 40, memory 90, and communicator 80.

Determiner 40 performs various determinations on the basis of behavior information Ia output from living body behavior estimator 30. Various determination steps performed by determiner 40 are described later in Variations.

Communicator 80 is a communication module and is communicably connected to management device 6 and information terminal 7 via the information communication network. The information communication network may be a wired network or include a wireless network. Communicator 80 outputs image information Ii and behavior information Ia generated in data processor 5 to management device 6 and information terminal 7. It should be noted that behavior information Ia generated in data processor 5 is stored in memory 90 as a history.

Figure 12:
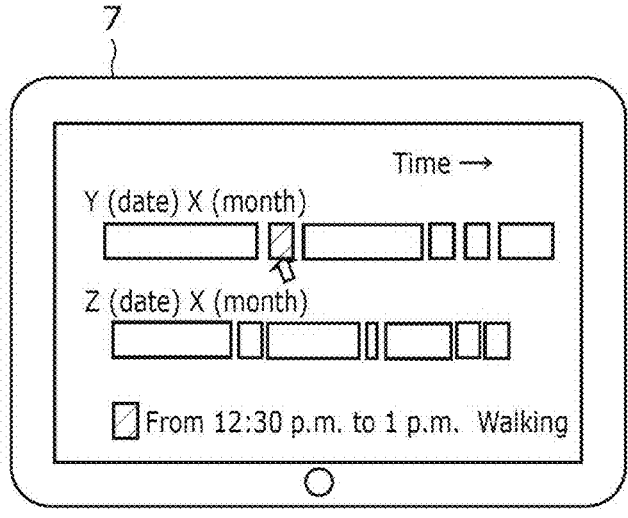
FIG. 12 illustrates an example of a screen displayed on the information terminal of the estimation system.

FIG. 12 illustrates an example of a screen displayed on information terminal 7 of estimation system 1.

Information terminal 7 in FIG. 12 is displaying, for each date and time, behavior information Ia on the person read out from memory 90 via communicator 80. Displaying of behavior information Ia on information terminal 7 enables the possessor of information terminal 7 to check behavior information Ia on the person inside facility 9.

Thus, estimation system 1 in Embodiment 1 includes first sound information obtainer 11, living body presence area estimator 20, and living body behavior estimator 30. First sound information obtainer 11 obtains first sound information Is1 regarding the reflected sound resulted from reflection of the transmission sound in the inaudible band inside facility 9. By inputting first sound information Is1 to first trained model M1, living body presence area estimator 20 outputs image information Ii indicating the living body presence area. By inputting image information Ii to second trained model M2, living body behavior estimator 30 outputs behavior information Ia indicating the behavior of the person inside facility 9.

Estimation system 1 outputs image information Ii indicating the presence area of the person, on the basis of the first sound information regarding the reflected sound resulted from reflection of the transmission sound in the inaudible band, and outputs behavior information Ia on the basis of image information Ii. Thus, estimation system 1 can estimate the behavior of the person while protecting privacy. Furthermore, estimation system 1 outputs image information Ii indicating the living body presence area on the basis of the reflected sound resulted from reflection of the transmission sound, and outputs behavior information Ia on the basis of image information Ii. Thus, estimation system 1 can estimate the behavior of the person even when the person is not emitting a sound.

[1.2 Estimation Method]

An estimation method according to Embodiment 1 is described. The estimation method in Embodiment 1 is a method for estimating a living body present inside facility 9.

Figure 13:
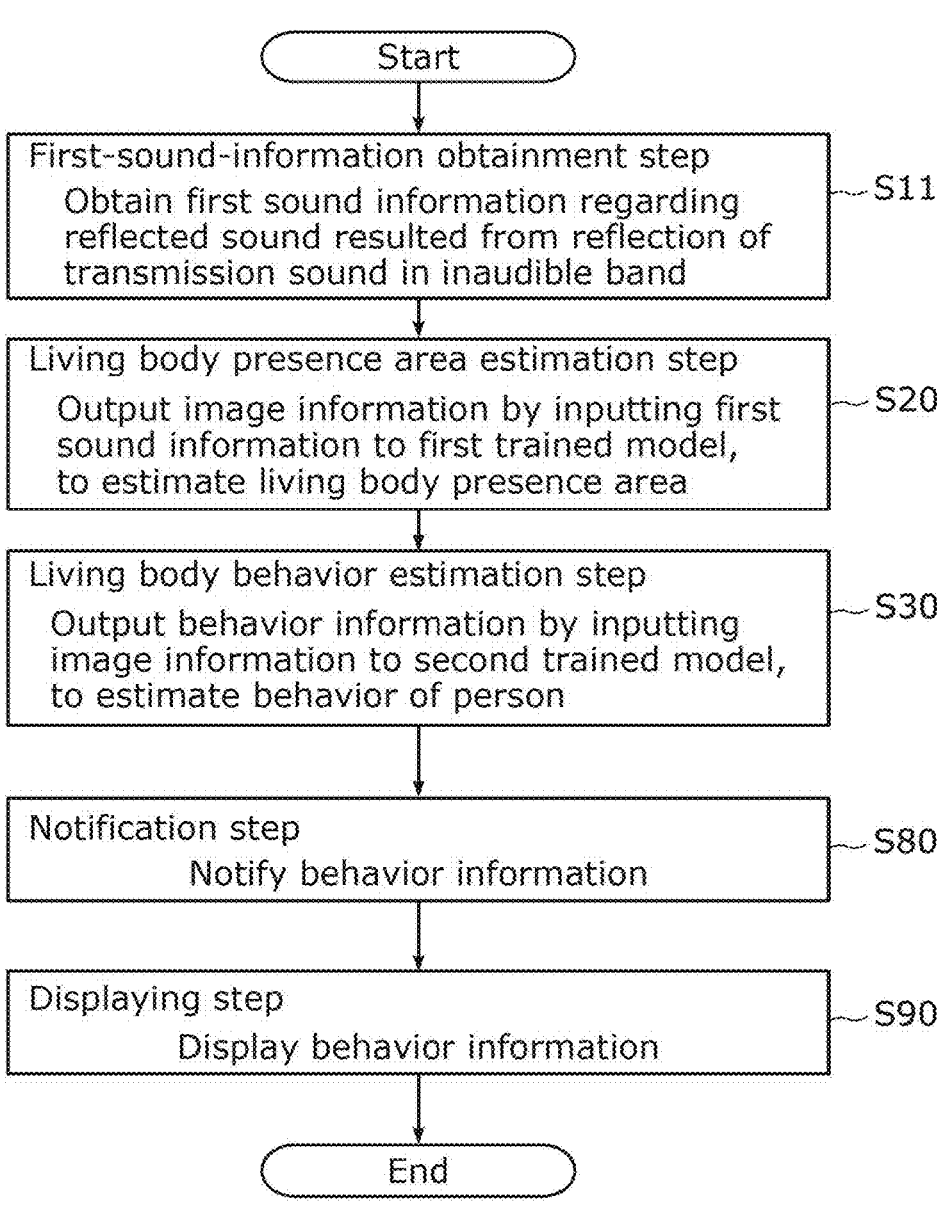
FIG. 13 is a flowchart illustrating an estimation method according to Embodiment 1.

FIG. 13 is a flowchart illustrating an estimation method according to Embodiment 1.

The estimation method in Embodiment 1 includes first-sound-information obtainment step S11 and living body presence area estimation step S20. Furthermore, the estimation method includes living body behavior estimation step S30. When estimation system 1 is in the setting mode to estimate the behavior of a person, first-sound-information obtainment step S11, living body presence area estimation step S20, and living body behavior estimation step S30 are sequentially, repeatedly performed.

The estimation method in Embodiment 1 further includes notification step S80 and displaying step S90. Notification step S80 and displaying step S90 are performed as necessary. The steps are described below.

In first-sound-information obtainment step S11, ultrasonic transmitter 2 transmits an ultrasonic wave inside facility 9. Then microphone 3 receives a reflected sound resulted from reflection of the transmission sound of the ultrasonic wave. First sound information Is1 regarding the reflected sound is obtained from the received sound. First sound information Is1 includes at least one of a signal waveform of the sound as illustrated in FIG. 4 or an image indicating the direction from which the sound is coming, as illustrated in FIG. 5. It should be noted that first sound information Is1 is not limited to information in which a sound is converted into an image and may be audio data.

In living body presence area estimation step S20, first sound information Is1 obtained in first-sound-information obtainment step S11 is input to first trained model M1, and image information Ii indicating the living body presence area is output from first trained model M1. First trained model M1 is a model trained using training sound information Ls regarding reflected sounds resulted from reflection of transmission sounds in the inaudible band and training images Lm each indicating a living body presence area in which a person is present. By performing living body presence area estimation step S20, the area in which the person is present inside facility 9 is estimated.

In living body behavior estimation step S30, image information Ii output in living body presence area estimation step S20 is input to second trained model M2, and behavior information Ia indicating the behavior of the person inside facility 9 is output from second trained model M2. Second trained model M2 is a model trained using training image information Li indicating living body presence areas and training behavior information La indicating the behaviors of a person.

Image information Ii input to second trained model M2 includes, for example, multiple image frames. In living body behavior estimation step S30, the number of image frames is determined according to the speed of movement of the person. In living body behavior estimation step S30, the number of image frames input to second trained model M2 is determined on the basis of a difference in the number of pixels included in the living body presence areas between two chronologically consecutive image frames, among the multiple image frames included in image information Ii. The two chronologically consecutive image frames are image frames next to each other when the multiple image frames are arranged chronologically.

Specifically, the number of pixels included in the living body presence area in one image frame is compared with the number of pixels included in the living body presence area in another image frame. If the difference in the number of pixels is smaller than a predetermined value, a time interval is increased. For instance, normally, inference is performed using 10 image frames in one second. However, when the difference in the number of pixels is close to zero, inference is performed using five image frames in one second. Meanwhile, when the difference in the number of pixels is greater than the predetermined value, a time interval is decreased. For instance, normally, inference is performed using 10 image frames in one second. However, when the difference in the number of pixels is large, inference is performed using 20 image frames in one second. In Embodiment 1, the behavior of the person inside facility 9 is estimated by performing the data processing in living body behavior estimation step S30.

In notification step S80, behavior information Ia estimated in living body behavior estimation step S30 is output to management device 6 or information terminal 7. It should be noted that in notification step S80, behavior information Ia including a past history may be output.

In displaying step S90, behavior information Ia output in notification step S80 is displayed on information terminal 7.

In the estimation method, image information Ii indicating the living body presence area is output on the basis of the first sound information regarding the reflected sound resulted from reflection of the transmission sound in the inaudible band, and behavior information Ia is output on the basis of image information Ii. Thus, it is possible to estimate the behavior of the person while protecting privacy. In the estimation method, image information Ii indicating the living body presence area is output on the basis of the reflected sound resulted from reflection of the transmission sound, and behavior information Ia is output on the basis of image information Ii. Thus, it is possible to estimate the behavior of the person even when the person is not emitting sound.

[1.3 Variation 1 of Embodiment 1]

Variation 1 of Embodiment 1 is described. In Variation 1, as an example, a case in which image frames used in living body behavior estimation step S30 include noise and the behavior of a person could not be estimated accurately is described.

Figure 14:
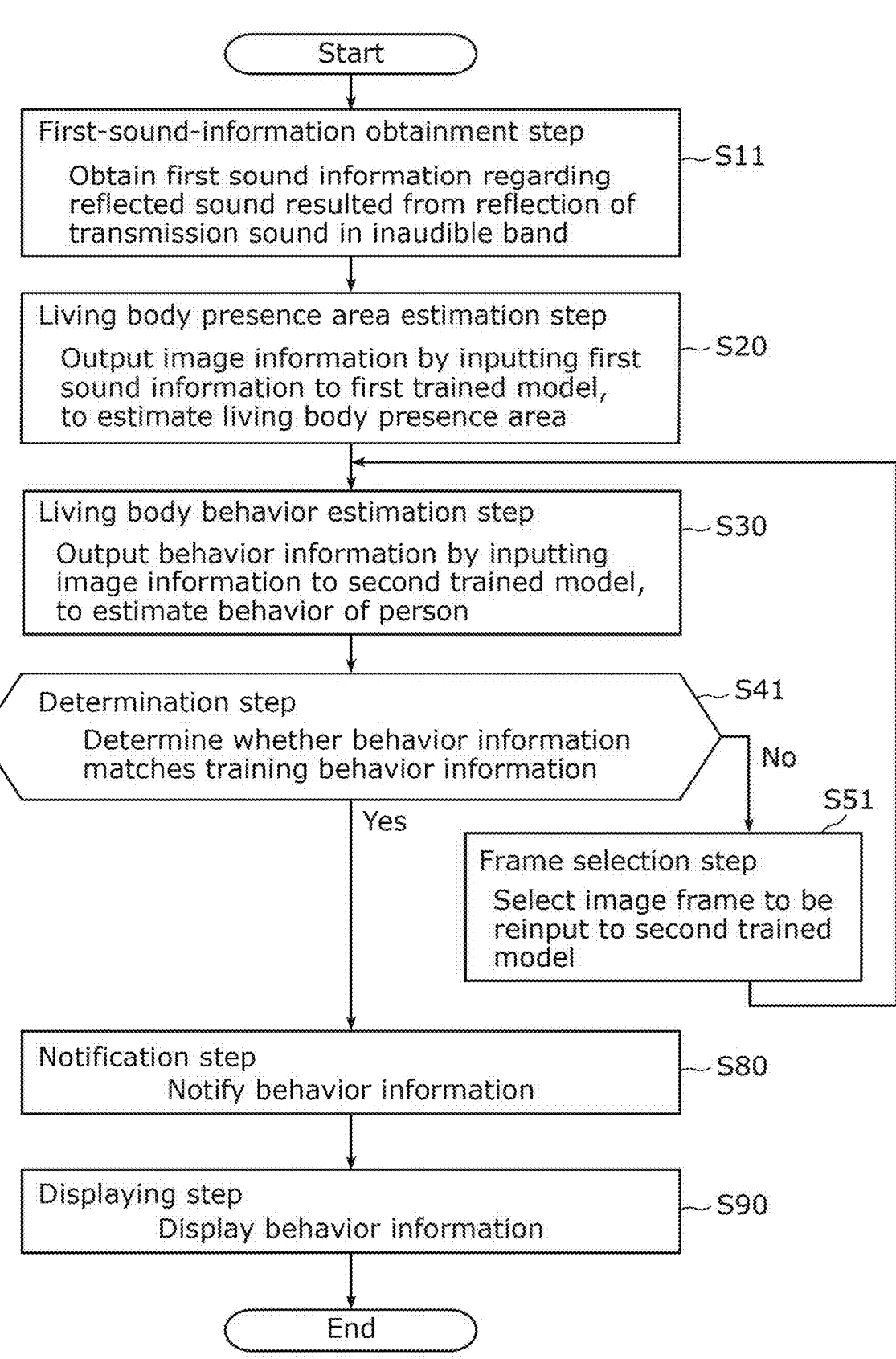
FIG. 14 is a flowchart illustrating an estimation method according to Variation 1 of Embodiment 1.

FIG. 14 is a flowchart illustrating an estimation method according to Variation 1 of Embodiment 1.

As with Embodiment 1, the estimation method in Variation 1 of Embodiment 1 includes first-sound-information obtainment step S11, living body presence area estimation step S20, living body behavior estimation step S30, notification step S80, and displaying step S90. The estimation method in Variation 1 of Embodiment 1 further includes determination step S41 and frame selection step S51 after living body behavior estimation step S30.

In determination step S41, whether behavior information Ia output in living body behavior estimation step S30 matches training behavior information La used when training second trained model M2 is determined.

When behavior information Ia matches training behavior information La (Yes in S41), the procedure proceeds to next notification step S80 on the assumption that behavior of a person has been correctly estimated. When behavior information Ia does not match training behavior information La (No in S41), it is determined that the behavior of the person could not be estimated. Inclusion of noise in an image frame is an example of a cause of not being able to correctly estimate the behavior of the person. In this case, the behavior of the person is estimated again after the image frame including the noise is removed. Specifically, when behavior information Ia does not match training behavior information La, frame selection step S51 is performed.

In frame selection step S51, image frames to be reinput to second trained model M2 are selected from among the multiple image frames used in living body behavior estimation step S30. For instance, two or more image frames are selected in frame selection step S51, the two or more image frames being image frames in which a difference in the number of pixels included in the living body presence area between two chronologically consecutive image frames among the multiple image frames is smaller than a predetermined threshold. By selecting the image frames in which the difference in the number of pixels is smaller than the predetermined threshold, it is possible to remove the image frame that lacks continuity as image data, which in other words is an image frame including noise.

In living body behavior estimation step S30, the two or more image frames selected in frame selection step S51 are reinput to second trained model M2, and behavior information Ia corresponding to the reinput image frames is output.

Thus, even when the behavior of the person could not be correctly estimated, the behavior of the person can be correctly estimated by removing the image frame that is the cause of the failure in estimation and estimating the behavior of the person again.

It should be noted that when many of the multiple image frames include noise and an image frame that should be selected is not present, reinputting of image frames to second trained model M2 is not performed. Instead, the procedure returns to first-sound-information obtainment step S11, and the next step is performed.

[1.4 Variation 2 of Embodiment 1]

Variation 2 of Embodiment 1 is described. In Variation 2 of Embodiment 1, a case in which a behavior included in behavior information Ia output in living body behavior estimation step S30 is abnormal is described.

Figure 15:
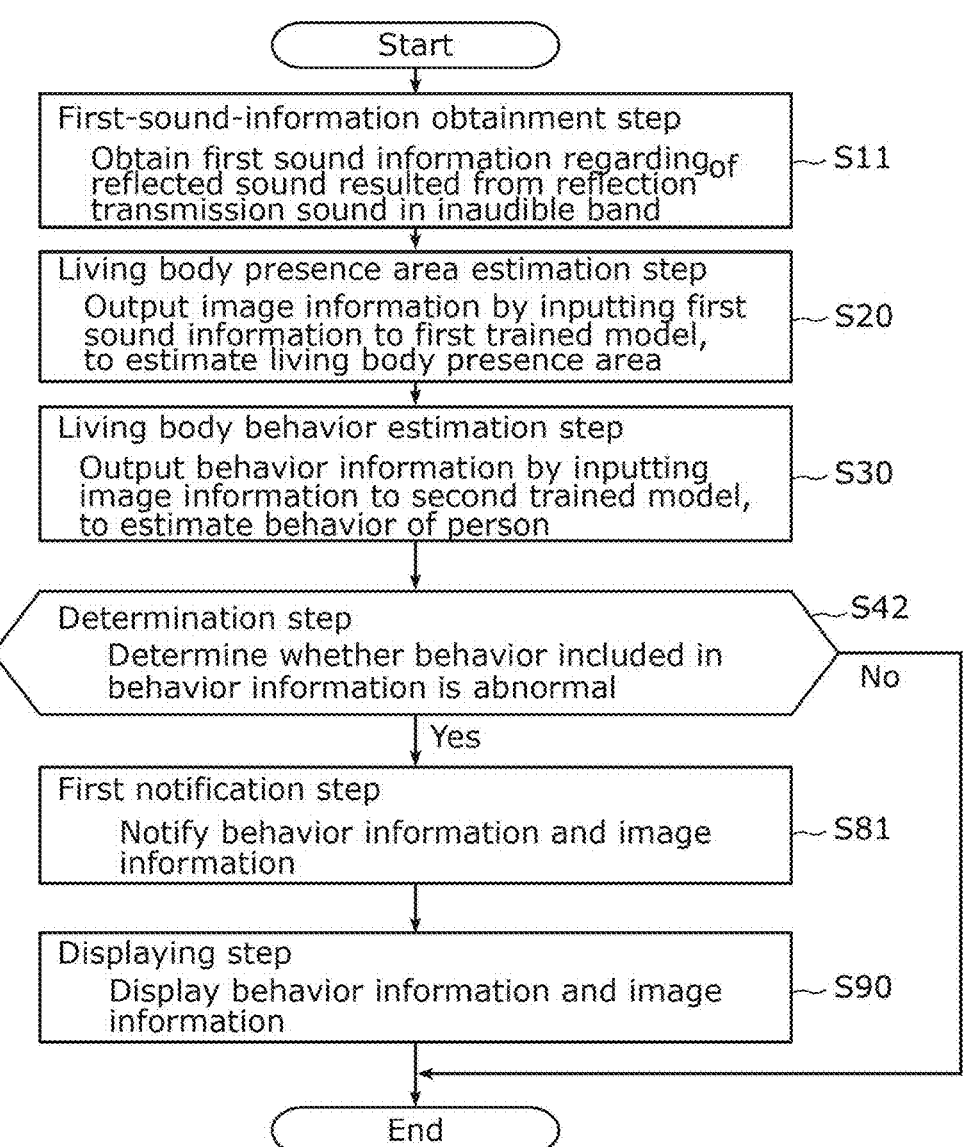
FIG. 15 is a flowchart illustrating an estimation method according to Variation 2 of Embodiment 1.

FIG. 15 is a flowchart illustrating an estimation method according to Variation 2 of Embodiment 1.

As with Embodiment 1, the estimation method in Variation 2 includes first-sound-information obtainment step S11, living body presence area estimation step S20, and living body behavior estimation step S30. The estimation method in Variation 2 further includes determination step S42 and first notification step S81 after living body behavior estimation step S30.

In determination step S42, whether a behavior included in behavior information Ia output in living body behavior estimation step S30 is abnormal is determined. The abnormal behaviors include at least one of, for example, falling down, falling off, walking with difficulty, getting burned, or accidental swallowing. The abnormal behaviors include, for example, a movement faster than daily movement, such as a living body's movement of at least 0.5 m in 0.05 seconds, and a joint movement in a direction different from the directions of daily joint movements.

When the behavior included in behavior information Ia is determined not to be abnormal (No in S42), the processing in the procedure ends. When the behavior included in behavior information Ia is determined to be abnormal (Yes in S42), first notification step S81 is performed.

In first notification step S81, behavior information Ia output in living body behavior estimation step S30 and image information Ii output in living body presence area estimation step S20 are output to management device 6 and information terminal 7 via communicator 80.

Figure 16A:
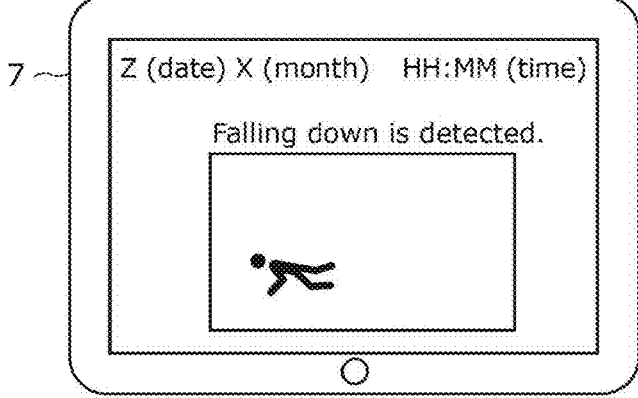
FIG. 16A illustrates an example of a screen displayed on an information terminal in Variation 2 of Embodiment 1.

FIG. 16A illustrates an example of a screen displayed on information terminal 7 in Variation 2 of Embodiment 1.

Information terminal 7 in FIG. 16A is displaying a state in which a person fell down. In this way, behavior information Ia and image information Ii output via communicator 80 are displayed live on information terminal 7 (displaying step S90). Displaying of behavior information Ia and image information Ii on information terminal 7 enables the possessor of information terminal 7 to check the details of the abnormal behavior of the person inside facility 9. Furthermore, as being able to obtain image information Ii as well as character information such as behavior information Ia, management device 6 can also check the details of the abnormal behavior of the person inside facility 9.

Figure 16B:
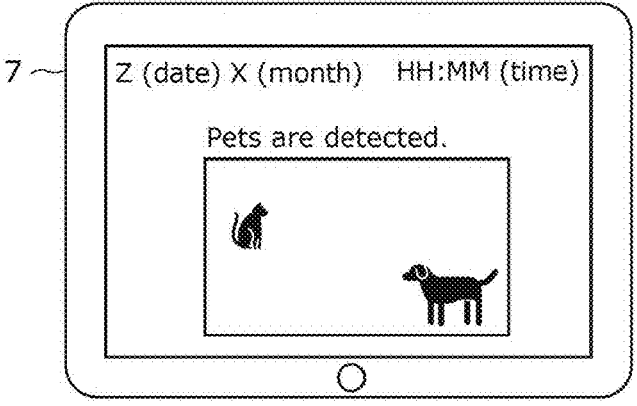
FIG. 16B illustrates another example of the screen displayed on the information terminal in Variation 2 of Embodiment 1.

FIG. 16B illustrates another example of the screen displayed on the information terminal in Variation 2 of Embodiment 1.

Information terminal 7 in FIG. 16B is displaying pets including a dog and a cat. As illustrated in FIG. 16B, behavior information Ia and image information Ii on a pet may be displayed live on information terminal 7. The possessor of information terminal 7 can identify which one of a pet or a person is present inside facility 9, by referring to the output image information. Displaying of behavior information Ia and image information Ii on the pet, on information terminal 7 enables the possessor of information terminal 7 to check the details of the abnormal behavior of the pet inside facility 9.

[1.5 Variation 3 of Embodiment 1]

Variation 3 of Embodiment 1 is described. In Variation 3 of Embodiment 1, an example in which health management is performed using the estimation result of an estimation method is described.

Figure 17:
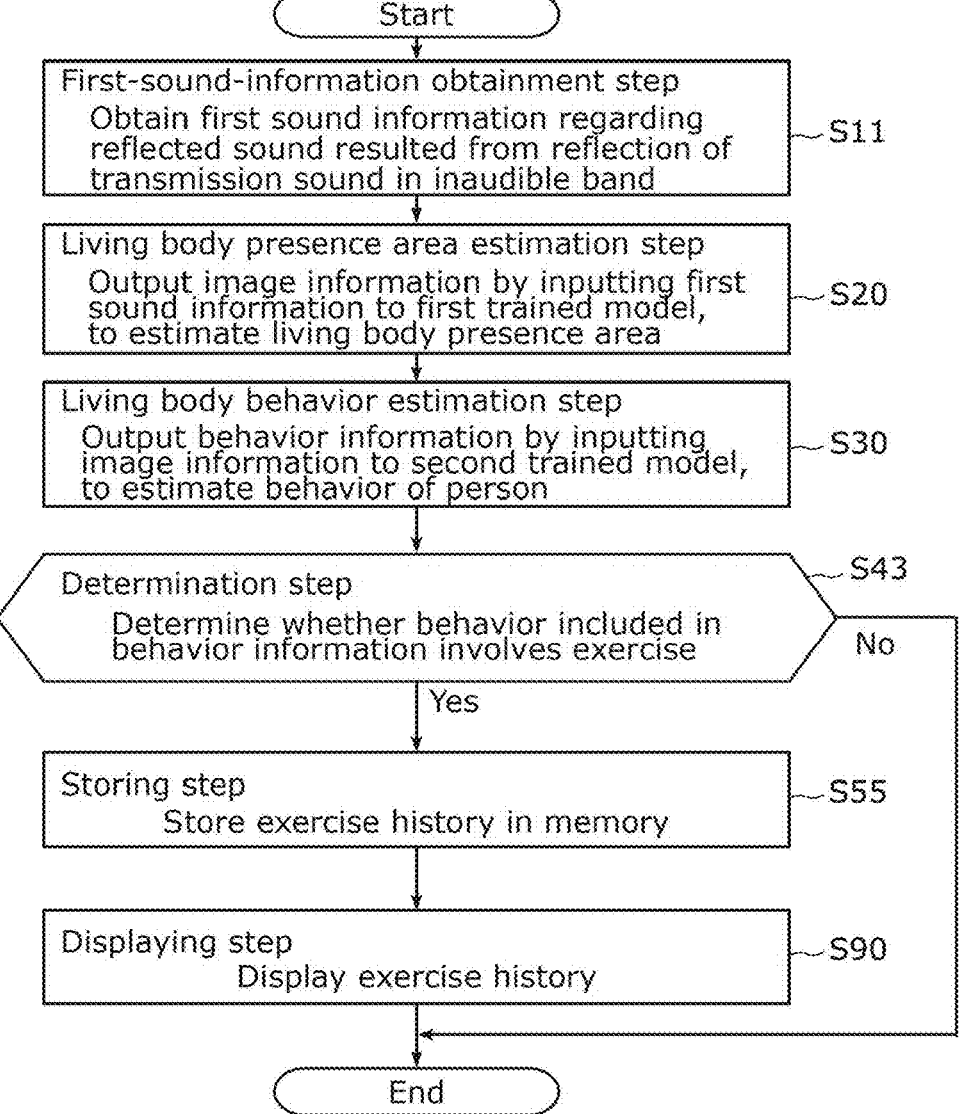
FIG. 17 is a flowchart illustrating an estimation method according to Variation 3 of Embodiment 1.

FIG. 17 is a flowchart illustrating an estimation method according to Variation 3 of Embodiment 1.

As with Embodiment 1, the estimation method in Variation 3 of Embodiment 1 includes first-sound-information obtainment step S11, living body presence area estimation step S20, and living body behavior estimation step S30. The estimation method in Variation 3 of Embodiment 1 further includes determination step S43 after living body behavior estimation step S30.

In determination step S43, whether a behavior included in behavior information Ia output in living body behavior estimation step S30 involves exercise is determined. Behaviors involving exercise are behaviors that contribute to improvement in physical fitness, such as walking, doing push-ups, and doing sit-ups.

When the behavior included in behavior information Ia is determined not to be a behavior involving exercise (No in S43), the processing in the procedure ends. When the behavior included in behavior information Ia is determined to be a behavior involving exercise (Yes in S43), an exercise history including time information is stored in memory 90 (storing step S55). The exercise history stored in memory 90 is displayed on information terminal 7 via communicator 80 (displaying step S90). The possessor of information terminal 7 can perform health management of a user of facility 9 on the basis of the displayed exercise history.

Embodiment 2

[2.1 Configuration of Estimation System]

Estimation system 1A according to Embodiment 2 is described with reference to FIGS. 18 to 23. In Embodiment 2, an example in which a device being used inside facility 9 is estimated using an environmental sound is described.

Figure 18:
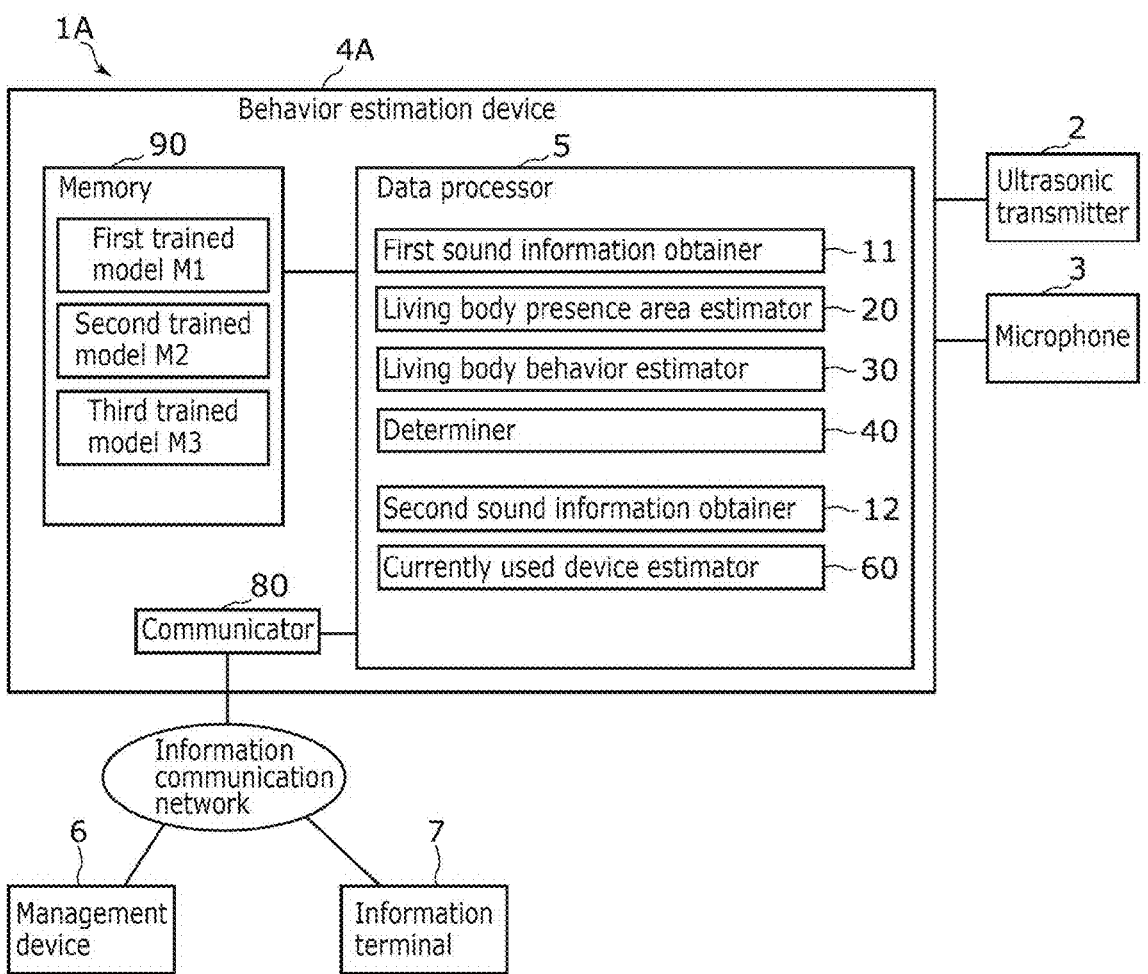
FIG. 18 is a block diagram illustrating an estimation system according to Embodiment 2 and a functional configuration of the behavior estimation device of the estimation system.

FIG. 18 is a block diagram illustrating estimation system 1A according to Embodiment 2 and a functional configuration of behavior estimation device 4A of estimation system 1A.

Estimation system 1A includes ultrasonic transmitter 2, microphone 3, and behavior estimation device 4A. Estimation system 1A further includes management device 6 and information terminal 7. Configurations of ultrasonic transmitter 2, management device 6, and information terminal 7 are similar to those described in Embodiment 1.

Microphone 3 in Embodiment 2 receives not only a reflected sound but also an environmental sound.

Environmental sounds include sounds emitted by devices inside facility 9. The environmental sounds are, for example, sounds emitted by automatic electric devices, such as a refrigerator, a microwave oven, a dishwasher, and a washing machine, a sound produced when operating or inputting to an electric device, and a sound when opening and closing a door. Furthermore, the environmental sounds include, for example, sounds emitted by electric devices that require continuous human operation to work, such as an electric toothbrush, an electric shaver, a hair dryer, and a cooking heater. Environmental sounds are output from these devices according to the usage status of each device.

The environmental sounds also include sounds emitted due to a person. The environmental sounds that the system should receive are abnormal sounds that normally do not occur and include, for example, a sound of a person falling down, a sound of a person falling off, a sound indicating a state in which a person is walking with difficulty, a sound of a person getting burned, and an accidental swallowing sound.

As illustrated in FIG. 18, behavior estimation device 4A includes data processor 5 including first sound information obtainer 11, living body presence area estimator 20, living body behavior estimator 30, and determiner 40. Behavior estimation device 4A further includes communicator 80 and memory 90. Configurations of first sound information obtainer 11, living body presence area estimator 20, and living body behavior estimator 30 are similar to those described in Embodiment 1.

A program for data processor 5 to perform data processing is stored in memory 90. Furthermore, memory 90 stores first trained model M1, second trained model M2, and third trained model M3 (described later) for use in estimating the behavior of a person.

Behavior estimation device 4A in Embodiment 2 further includes second sound information obtainer 12 and currently used device estimator 60.

Second sound information obtainer 12 obtains second sound information Is2 regarding an environmental sound other than a reflected sound among environmental sounds inside facility 9. For instance, second sound information obtainer 12 generates second sound information Is2 by performing various data processing tasks on a received-sound signal output from microphone 3. Specifically, second sound information obtainer 12 extracts, from the received-sound signal, the signal of the environmental sound other than the reflected sound.

The environmental sound other than the reflected sound does not include a voice band. Thus, in Embodiment 2, second sound information obtainer 12 obtains the information regarding the environmental sound other than the reflected sound. Since the information regarding the environmental sound other than the reflected sound is obtained, information regarding the sound of a person's speech is not picked up. As such, it is possible to protect the privacy of a person inside facility 9.

Figure 19:
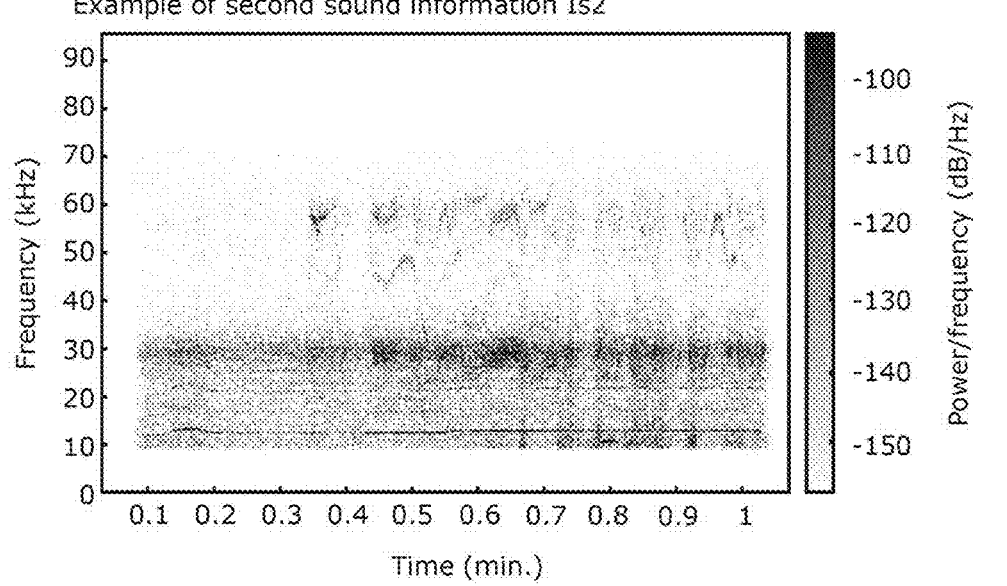
FIG. 19 illustrates an example of second sound information obtained by the second sound information obtainer of the behavior estimation device.

FIG. 19 illustrates an example of second sound information Is2 obtained by second sound information obtainer 12 of behavior estimation device 4A.

FIG. 19 illustrates a spectrogram image indicating the frequency (kHz) and power (dB/Hz) of the sound. FIG. 19 illustrates, for example, one-minute sound information including an operating sound of a vacuum cleaner. The horizontal axis in FIG. 19 indicates time, and the vertical axis in FIG. 19 indicates frequency, and frequencies less than or equal to 10 kHz are not included in FIG. 19. In FIG. 19, the power of the sound is represented by color shades, and the closer to black, the higher the power of the sound. It should be noted that as long as the scales of images to be input to a trained model, which is described later, are the same, the spectrogram image does not necessarily require the coordinate axes and a scale.

Second sound information Is2 obtained by second sound information obtainer 12 is output to currently used device estimator 60.

Currently used device estimator 60 estimates a device being used inside facility 9. Specifically, by inputting, to third trained model M3, second sound information Is2 output from second sound information obtainer 12, currently used device estimator 60 outputs device information Ie indicating the device being used inside facility 9.

FIG. 20 illustrates third trained model M3 used by currently used device estimator 60 of behavior estimation device 4A.

Third trained model M3 illustrated in FIG. 20 is an inference model trained using training sound information Ls regarding environmental sounds other than reflected sounds and training device information Le indicating devices that can be used inside facility 9. Third trained model M3 is generated in advance by a computer different from behavior estimation device 4A. Furthermore, input data and training data for use in generating third trained model M3 are created in advance.

FIG. 21 illustrates input data and training data for use in generating third trained model M3.

Spectrogram images are used as training sound information Ls which is the input data. Information indicating the devices that can be used inside facility 9 is used as training device information Le which is the training data. The devices that can be used inside facility 9 include, for example, a washing machine, a microwave oven, a refrigerator, a dishwasher, an electric toothbrush, an electric shaver, a hair dryer, and a cooking heater.

Thus, third trained model M3 is generated by machine learning using training sound information Ls and training device information Le. Third trained model M3 generated in advance is stored in memory 90.

By inputting, to third trained model M3 generated in the above manner, second sound information Is2 obtained by second sound information obtainer 12, currently used device estimator 60 outputs device information Ie indicating the device being used inside facility 9.

FIG. 22 illustrates an example of second sound information Is2 input to third trained model M3 and an example of device information Ie output from third trained model M3 in currently used device estimator 60.

As illustrated in FIG. 22, second sound information Is2 input to third trained model M3 is a spectrogram image. Second sound information Is2 represents an environmental sound as a frequency spectrogram. In this respect, second sound information Is2 is the same type of information as training sound information Ls.

As illustrated in FIG. 22, device information Ie output from third trained model M3 is information indicating the device being used inside facility 9. Device information Ie indicates the currently used device by characters. In this respect, device information Ie is the same type of information as training device information Le.

In this manner, on the basis of second sound information Is2, currently used device estimator 60 outputs device information Ie indicating the device being used inside facility 9. Device information Ie output from currently used device estimator 60 is output to determiner 40, memory 90, and communicator 80.

Determiner 40 performs various determinations on the basis of behavior information Ia output from living body behavior estimator 30 and device information Ie output from currently used device estimator 60.

Communicator 80 is a communication module and is communicably connected to management device 6 and information terminal 7 via an information communication network. Communicator 80 outputs image information Ii, behavior information Ia, and device information Ie generated in data processor 5 to management device 6 and information terminal 7. It should be noted that each of behavior information Ia and device information Ie generated in data processor 5 is stored in memory 90 as a history.

Figure 23:
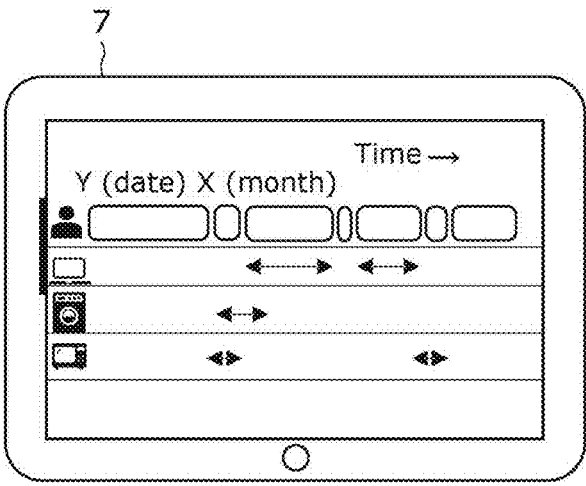
FIG. 23 illustrates an example of a screen displayed on the information terminal of the estimation system.

FIG. 23 illustrates an example of a screen displayed on information terminal 7 of estimation system 1A.

Information terminal 7 in FIG. 23 is displaying, for each date and time, behavior information Ia and device information Ie read out from memory 90 via communicator 80. Displaying of behavior information Ia and device information Ie on information terminal 7 enables the possessor of information terminal 7 to check behavior information Ia and device information Ie inside facility 9.

Estimation system 1A in Embodiment 2 includes first sound information obtainer 11, living body presence area estimator 20, living body behavior estimator 30, second sound information obtainer 12, and currently used device estimator 60. Second sound information obtainer 12 obtains second sound information Is2 regarding the environmental sound other than the reflected sound among the environmental sounds inside facility 9. By inputting second sound information Is2 to third trained model M3, currently used device estimator 60 outputs device information Ie indicating the device being used inside facility 9.

Estimation system 1A outputs device information Ie on the basis of second sound information Is2 regarding the environmental sound other than the reflected sound. Accordingly, estimation system 1A can estimate the device being used inside facility 9 while protecting privacy.

[2.2 Estimation Method]

An estimation method according to Embodiment 2 is described. An estimation method in Embodiment 2 is a method for estimating the behavior of a person inside facility 9 and a device being used inside facility 9.

Figure 24:
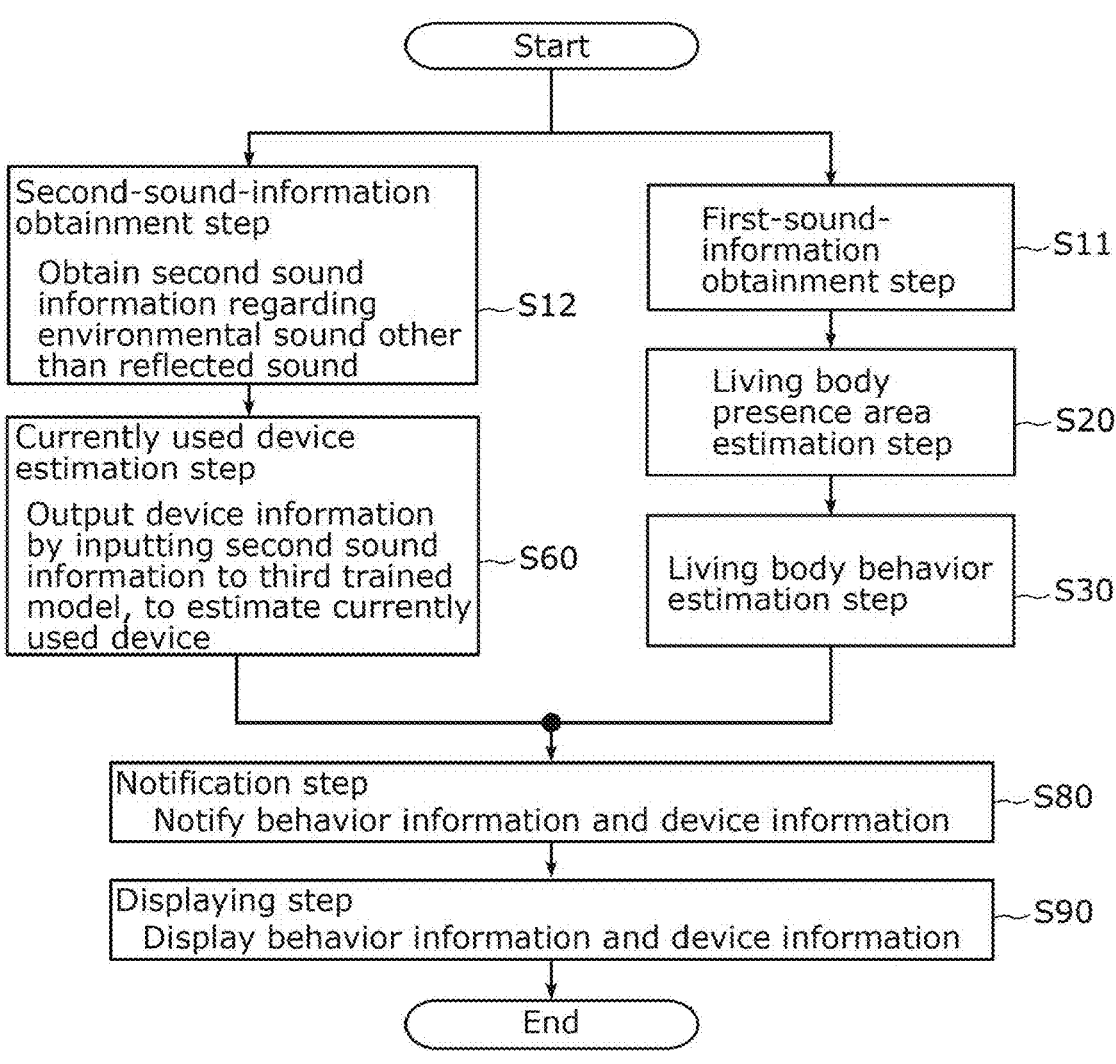
FIG. 24 is a flowchart illustrating an estimation method according to Embodiment 2.

FIG. 24 is a flowchart illustrating an estimation method according to Embodiment 2.

As with Embodiment 1, the estimation method in Embodiment 2 includes first-sound-information obtainment step S11, living body presence area estimation step S20, and living body behavior estimation step S30. The estimation method in Embodiment 2 further includes second-sound-information obtainment step S12, currently used device estimation step S60, notification step S80, and displaying step S90.

When estimation system 1A is in the setting mode to estimate the behavior of a person, first-sound-information obtainment step S11, living body presence area estimation step S20, living body behavior estimation step S30, second-sound-information obtainment step S12, and currently used device estimation step S60 are repeatedly performed. For instance, a computer performs first-sound-information obtainment step S11, living body presence area estimation step S20, and living body behavior estimation step S30 in parallel with second-sound-information obtainment step S12 and currently used device estimation step S60.

In second-sound-information obtainment step S12, microphone 3 receives environmental sounds inside facility 9. Among the received sounds, second sound information Is2 regarding a sound other than a reflected sound is obtained. Second sound information Is2 is information including a spectrogram image as illustrated in FIG. 19 that indicates the frequency and power of the sound. It should be noted that second sound information Is2 is not limited to information in which a sound is converted into an image and may be audio data.

In currently used device estimation step S60, second sound information Is2 obtained in second-sound-information obtainment step S12 is input to third trained model M3, and device information Ie indicating the device being used inside facility 9 is output from third trained model M3. Third trained model M3 is a model trained using training sound information Ls regarding the environmental sounds other than the reflected sounds and training device information Le indicating the devices that can be used inside facility 9. The device being used inside facility 9 is estimated by performing currently used device estimation step S60.

In notification step S80, behavior information Ia estimated in living body behavior estimation step S30 and device information Ie estimated in currently used device estimation step S60 are output to management device 6 or information terminal 7. In notification step S80, behavior information Ia and device information Ie which each include a past history may be output.

In displaying step S90, behavior information Ia and device information Ie output in notification step S80 are displayed on information terminal 7.

In the estimation method in Embodiment 2, device information Ie is output on the basis of second sound information Is2 regarding the environmental sound other than the reflected sound. Accordingly, it is possible to estimate the device being used inside facility 9 while protecting privacy.

[2.3 Variation 1 of Embodiment 2]

Variation 1 of Embodiment 2 is described. In Variation 1 of Embodiment 2, an example is described in which whether the behavior of a person is abnormal is determined using both device information Ie and behavior information Ia.

Figure 25:
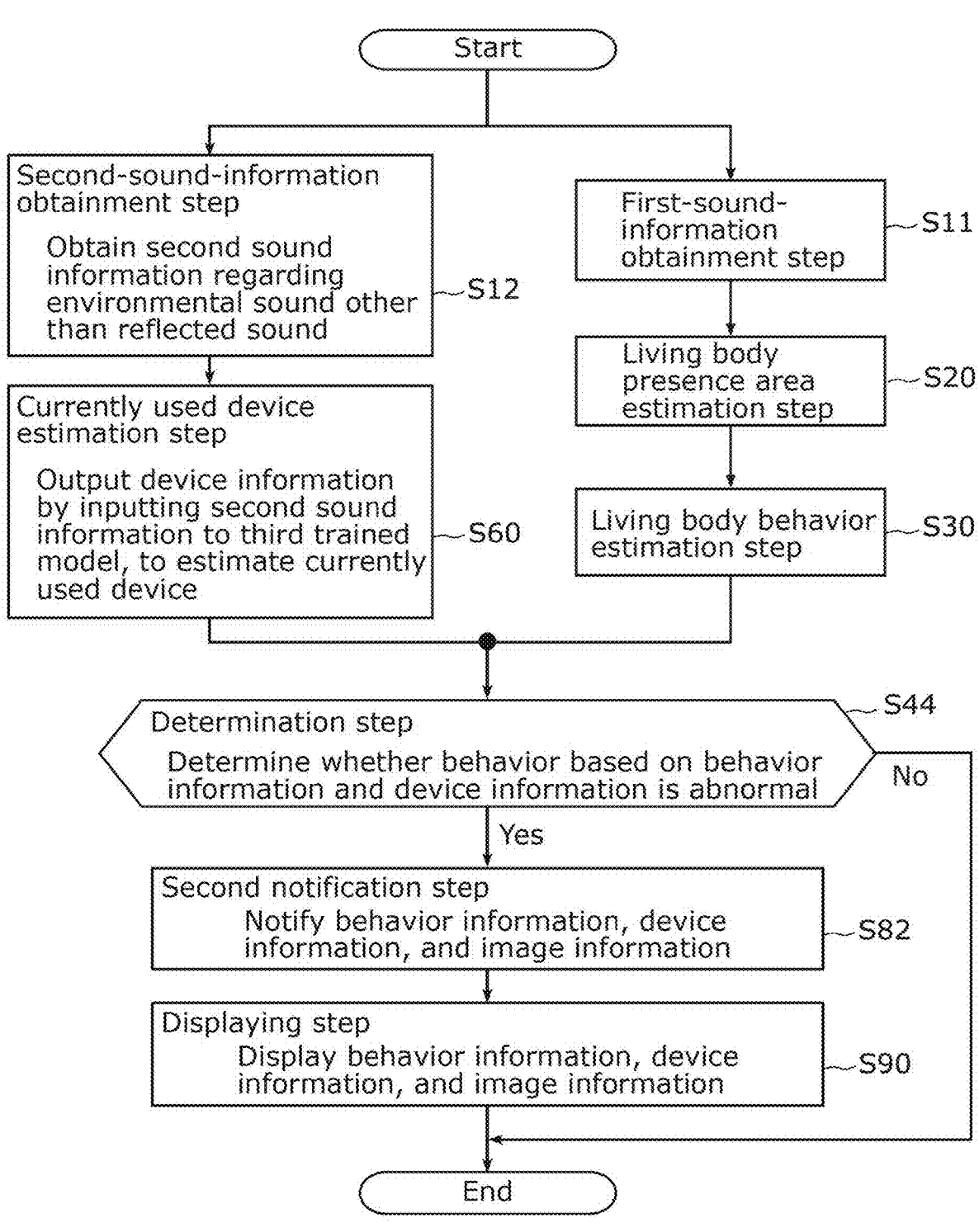
FIG. 25 is a flowchart illustrating an estimation method according to Variation 1 of Embodiment 2.

FIG. 25 is a flowchart illustrating an estimation method according to Variation 1 of Embodiment 2.

As with Embodiment 2, the estimation method in Variation 1 of Embodiment 2 includes first-sound-information obtainment step S11, living body presence area estimation step S20, living body behavior estimation step S30, second-sound-information obtainment step S12, and currently used device estimation step S60. The estimation method in Variation 1 of Embodiment 2 further includes determination step S44 and second notification step S82 after living body behavior estimation step S30.

In determination step S44 in Variation 1 of Embodiment 2, whether the behavior of a person is abnormal is determined on the basis of behavior information Ia output in living body behavior estimation step S30 and device information Ie output in currently used device estimation step S60. For instance, consider a case in which a behavior included in behavior information Ia is estimated to be an abnormal behavior such as falling down and a device included in device information Ie is estimated to be a device that requires continuous human operation to work. In this case, when the device has been operating for a long time, it is estimated that the person could not switch off the device due to, for example, falling down. In Variation 1 of Embodiment 2, whether the behavior of the person is abnormal is determined using both behavior information Ia and device information Ie. Thus, the accuracy of a determination result is higher, compared with when the behavior of the person is determined on the basis of only behavior information Ia.

In determination step S44, when the behavior is determined not to be abnormal (No in S44), the processing in the procedure ends. In determination step S44, when the behavior is determined to be abnormal (Yes in S44), second notification step S82 is performed.

In second notification step S82, behavior information Ia, device information Ie, and image information Ii are output to management device 6 and information terminal 7 via communicator 80.

Behavior information Ia on the person, device information Ie, and image information Ii output via communicator 80 are displayed live on information terminal 7 (displaying step S90). Displaying of behavior information Ia, device information Ie, and image information Ii on information terminal 7 enables the possessor of information terminal 7 to check the details of the abnormal behavior of the person inside facility 9. As being able to obtain device information Ie and image information Ii as well as behavior information Ia, management device 6 can also check the details of the abnormal behavior of the person inside facility 9.

[2.4 Variation 2 of Embodiment 2]

Variation 2 of Embodiment 2 is described. In Variation 2 of Embodiment 2, an example is described in which a device being used inside facility 9 is estimated using information regarding the direction from which an environmental sound is coming.

Figure 26:
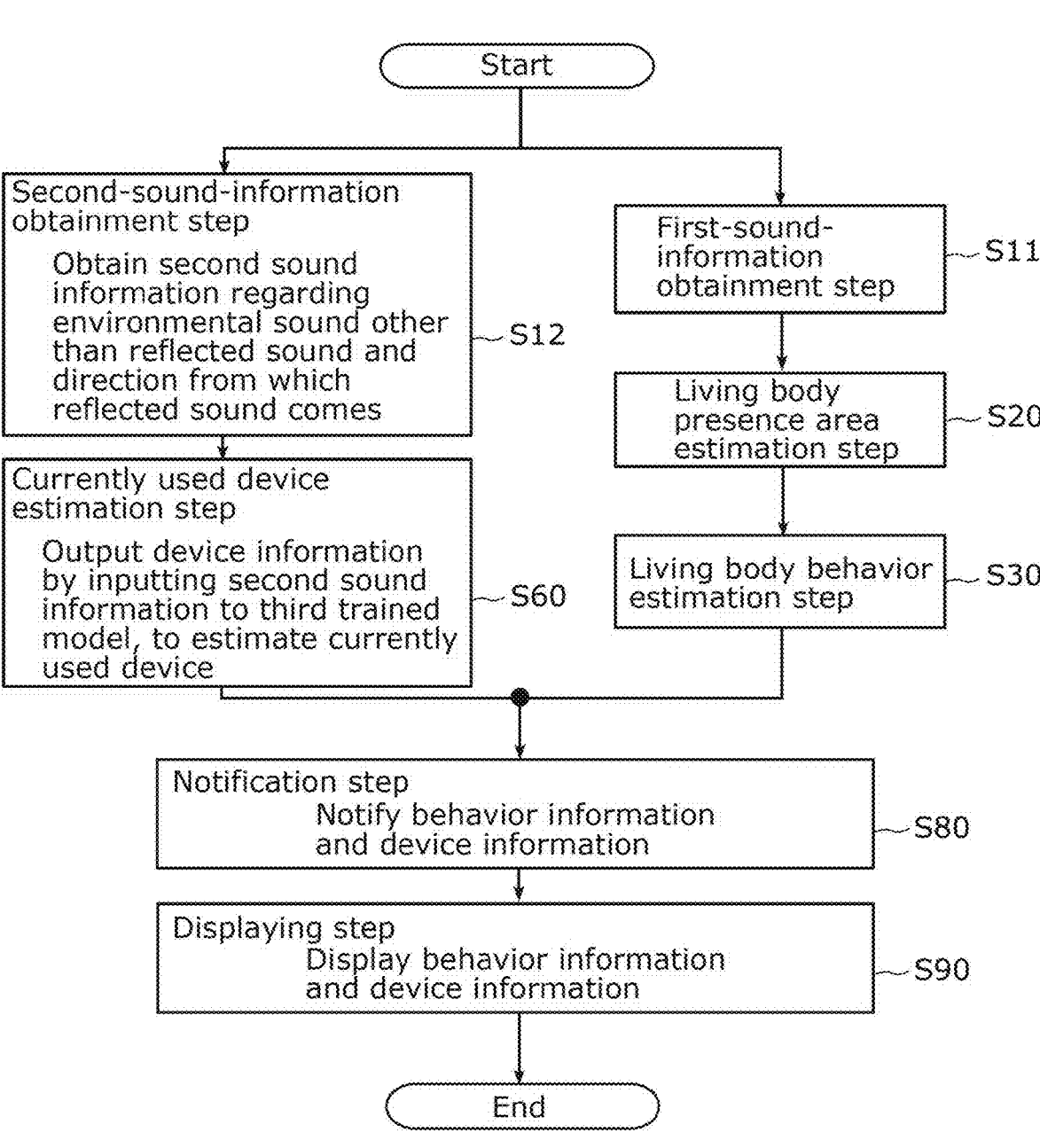
FIG. 26 is a flowchart illustrating an estimation method according to Variation 2 of Embodiment 2.

FIG. 26 is a flowchart illustrating an estimation method according to Variation 2 of Embodiment 2.

Second-sound-information obtainment step S12 and currently used device estimation step S60 in the estimation method in Variation 2 of Embodiment 2 are little different from those in the estimation method in Embodiment 2.

For instance, in second-sound-information obtainment step S12, second sound information Is2 also includes information regarding the direction from which an environmental sound other than a reflected sound is coming. In this respect, Variation 2 of Embodiment 2 differs from Embodiment 2. The information regarding the direction from which the environmental sound is coming is obtained by performing delay-and-sum beamforming on the received-sound signal of a sound received using microphones 3.

Furthermore, third trained model M3 used in currently used device estimation step S60 is trained using training sound information Ls including information regarding the direction from which an environmental sound other than a reflected sound is coming and training device information Le indicating devices that can be used inside facility 9. In this respect, Variation 2 of Embodiment 2 differs from Embodiment 2.

In this way, by estimating the device being used inside facility 9, on the further basis of the information regarding the direction from which the environmental sound is coming, it is possible to improve the accuracy of device information Ie. Thus, it is possible to improve the accuracy of estimation when estimating the behavior of a person on the basis of both behavior information Ia and device information Ie, for example.

[2.5 Variation 3 of Embodiment 2]

Variation 3 of Embodiment 2 is described. In Variation 3 of Embodiment 2, an example in which whether a device is in abnormal use is determined is described.

Figure 27:
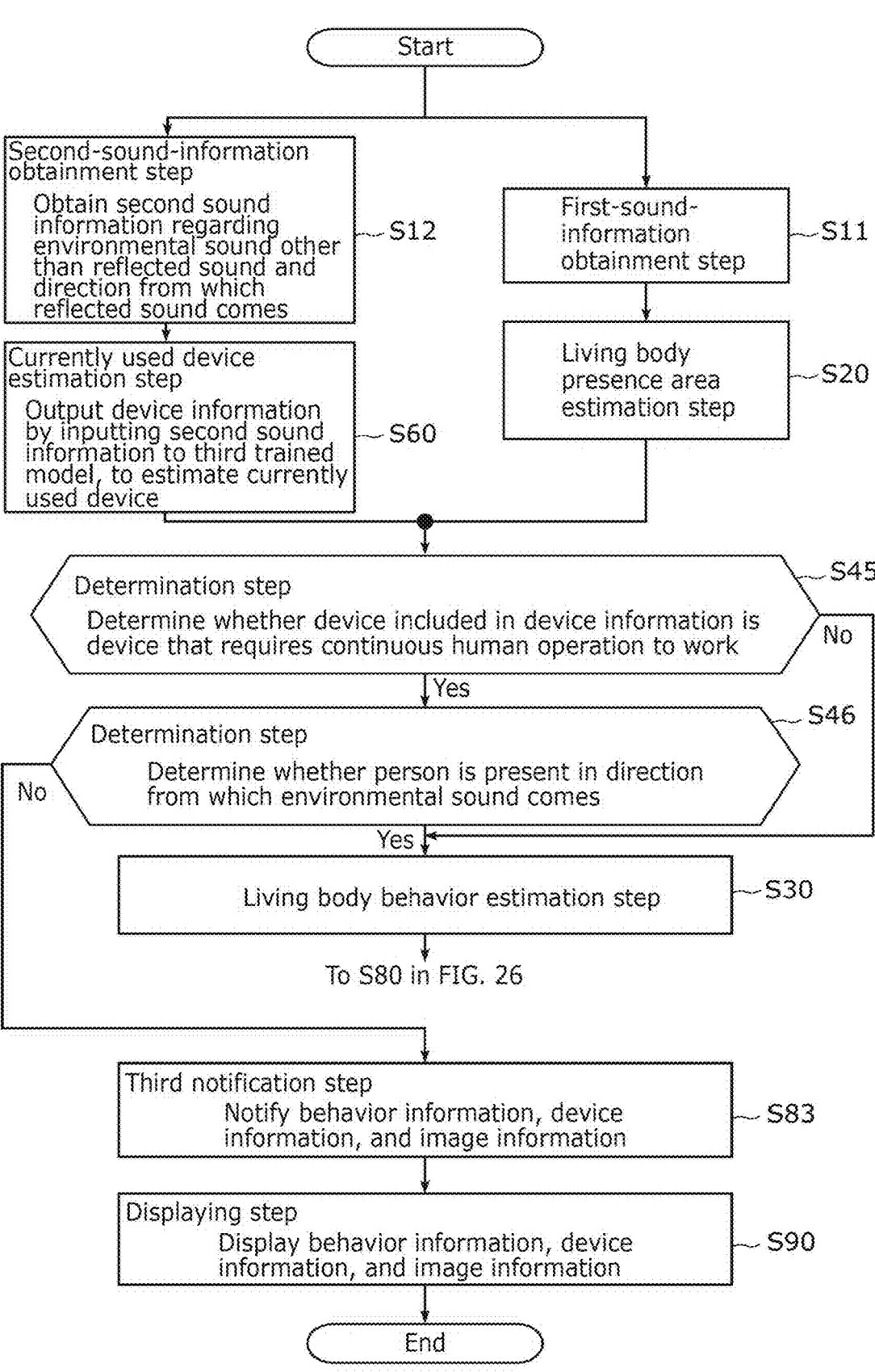
FIG. 27 is a flowchart illustrating an estimation method according to Variation 3 of Embodiment 2.

FIG. 27 is a flowchart illustrating an estimation method according to Variation 3 of Embodiment 2.

As with Variation 2 of Embodiment 2, the estimation method in Variation 3 of Embodiment 2 includes first-sound-information obtainment step S11, living body presence area estimation step S20, second-sound-information obtainment step S12, and currently used device estimation step S60. The estimation method in Variation 3 of Embodiment 2 further includes the two determination steps, determination steps S45 and S46 and third notification step S83.

In first determination step S45, whether a device included in device information Ie is a device that requires continuous human operation to work is determined. Devices that require continuous human operation to work include, for example, a hair dryer, an electric shaver, and an electric toothbrush.

In determination step S45, when the device included in device information Ie is determined not to be a device that requires continuous human operation to work (No in S45), as with Variation 2 of Embodiment 2, living body behavior estimation step S30 is performed after living body presence area estimation step S20. Meanwhile, in determination step S45, when the device included in device information Ie is determined to be a device that requires continuous human operation to work (Yes in S45), second determination step S46 is performed.

In second determination step 46, whether a person is present in the direction from which an environmental sound is coming is determined on the basis of image information Ii output in living body presence area estimation step S20 and information regarding the direction from which an environmental sound is coming obtained in second-sound-information obtainment step S12.

In determination step 46, when a person is determined to be present in the direction from which the environmental sound is coming (Yes in S46), since the device is not in abnormal use, living body behavior estimation step S30 is performed after living body presence area estimation step S20 as with Variation 2 in Embodiment 2. Meanwhile, in determination step 46, when a person is determined not to be present in the direction from which the environmental sound is coming (No in S46), the device is considered in abnormal use. For instance, when a hair dryer, which requires continuous human operation to work, is working, if a person is not present in the direction from which the sound of the hair dryer is coming, it is assumed that the power of the hair dryer is left on. In this case, third notification step S83 to output information indicating that the device is in abnormal use is performed.

In third notification step S83, behavior information Ia, device information Ie, and image information Ii are output to management device 6 and information terminal 7 via communicator 80.

Behavior information Ia, device information Ie, and image information Ii output via communicator 80 are displayed on information terminal 7 (displaying step S90). Displaying behavior information Ia, device information Ie, and image information Ii on information terminal 7 enables the possessor of information terminal 7 to check whether the device inside facility 9 is in abnormal use. As being able to obtain device information Ie and image information Ii as well as behavior information Ia, management device 6 can also check in particular whether the device inside facility 9 is in abnormal use.

Embodiment 3

[3.1 Configuration of Estimation System]

Estimation system 1B according to Embodiment 3 is described with reference to FIGS. 28 and 29. In Embodiment 3, an example is described in which the specific behavior of a person as information in which a person's behavior is further detailed is estimated.

Figure 28:
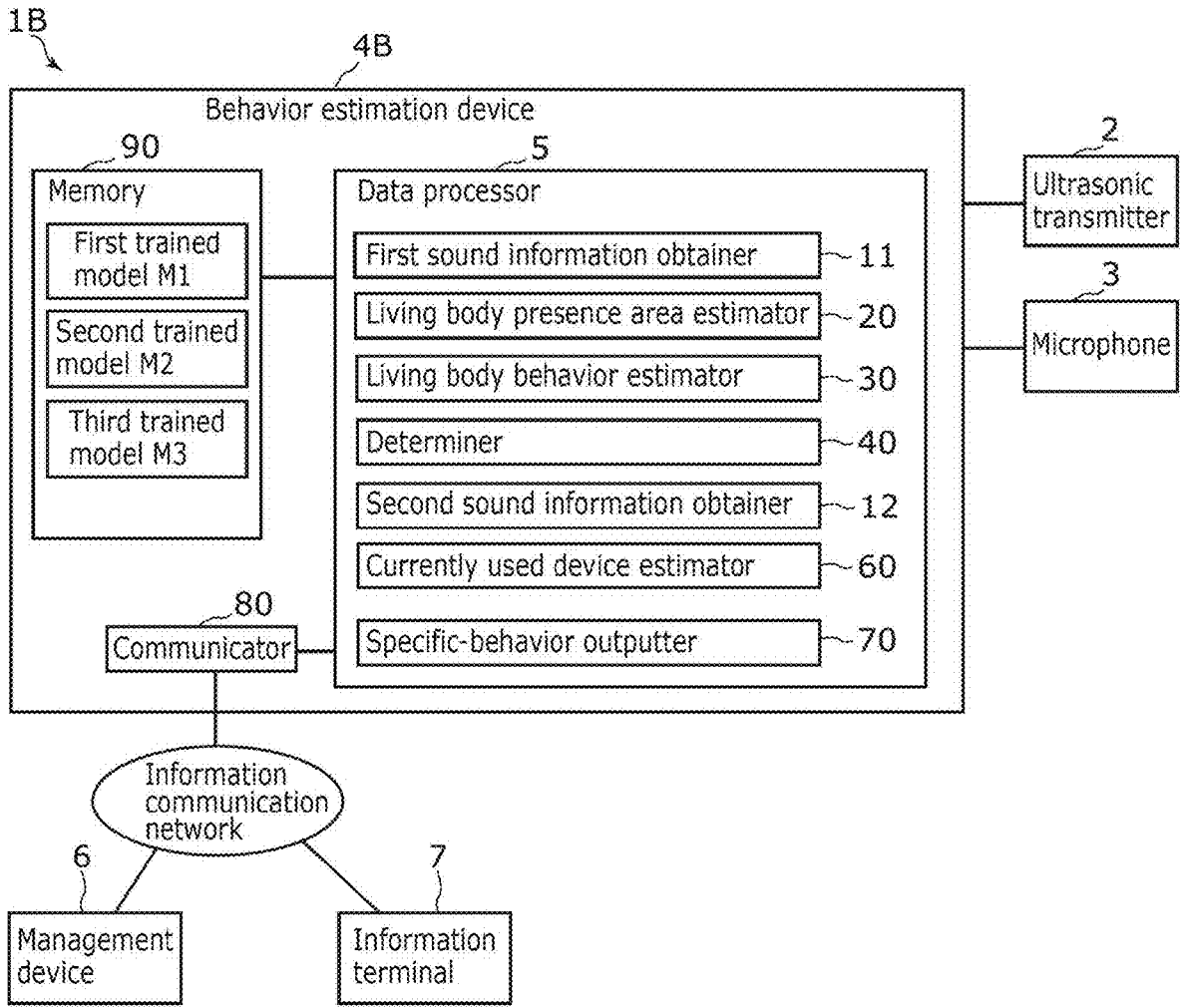
FIG. 28 is a block diagram illustrating an estimation system according to Embodiment 3 and a functional configuration of the behavior estimation device of the estimation system.

FIG. 28 is a block diagram illustrating estimation system 1B according to Embodiment 3 and a functional configuration of behavior estimation device 4B of estimation system 1B.

As with Embodiment 2, estimation system 1B includes ultrasonic transmitter 2, microphone 3, behavior estimation device 4B, management device 6, and information terminal 7.

As with in Embodiment 2, behavior estimation device 4B includes data processor 5 including first sound information obtainer 11, living body presence area estimator 20, living body behavior estimator 30, second sound information obtainer 12, currently used device estimator 60, and determiner 40. Behavior estimation device 4B further includes communicator 80 and memory 90. Behavior estimation device 4B in Embodiment 3 further includes specific-behavior outputter 70.

Specific-behavior outputter 70 outputs specific behavior information Iad on a person on the basis of device information Ie output by currently used device estimator 60 and behavior information Ia output by living body behavior estimator 30. Specific behavior information Iad is information in which behavior information on the person is further detailed. For instance, when a device included in device information Ie is a microwave oven and a behavior included in behavior information Ia is meal preparation, specific-behavior outputter 70 outputs specific behavior information Iad indicating that a person inside facility 9 is cooking with a microwave oven. Specific behavior information Iad output from specific-behavior outputter 70 is output to information terminal 7 via communicator 80.

Figure 29:
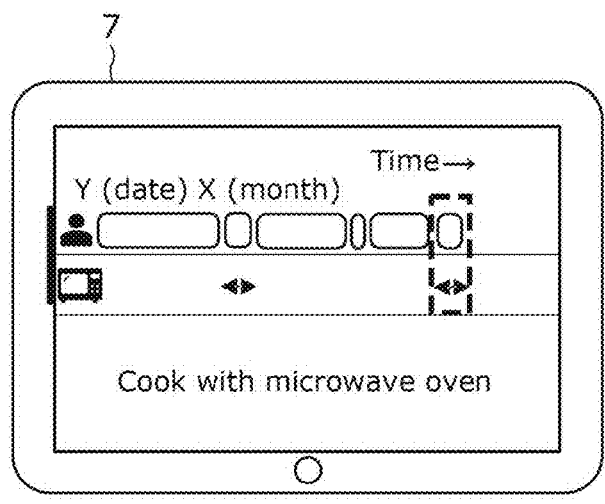
FIG. 29 illustrates an example of a screen displayed on the information terminal of the estimation system.

FIG. 29 illustrates an example of a screen displayed on information terminal 7 of estimation system 1B.

Information terminal 7 in FIG. 29 is displaying information indicating that a person inside facility 9 is cooking with a microwave oven. Thus, specific behavior information Iad output via communicator 80 is displayed live on information terminal 7. Displaying of specific behavior information Iad on information terminal 7 enables the possessor of information terminal 7 to check the further details of the current behavior of the person inside facility 9.

In estimation system 1B in Embodiment 3, specific behavior information Iad is output using both device information Ie and behavior information Ia, which makes it possible to estimate the specific behavior of the person.

[3.2 Estimation Method]

An estimation method according to Embodiment 3 is described.

Figure 30:
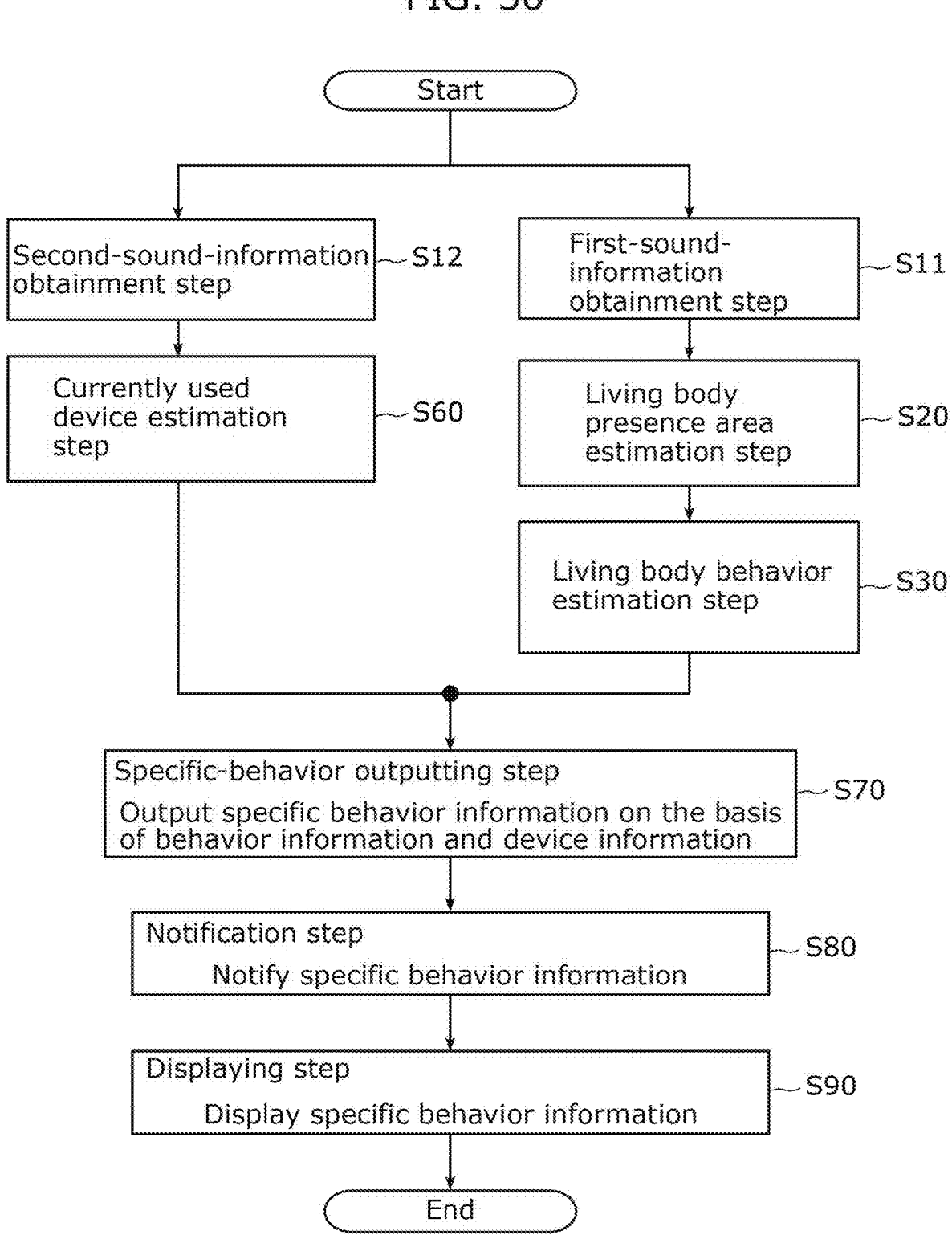
FIG. 30 is a flowchart illustrating an estimation method according to Embodiment 3.

FIG. 30 is a flowchart illustrating an estimation method according to Embodiment 3.

As with Embodiment 2, the estimation method in Embodiment 3 includes first-sound-information obtainment step S11, living body presence area estimation step S20, living body behavior estimation step S30, second-sound-information obtainment step S12, and currently used device estimation step S60. The estimation method in Embodiment 3 further includes specific-behavior outputting step S70.

In specific-behavior outputting step S70, specific behavior information Iad on a person is output on the basis of device information Ie output in currently used device estimation step S60 and behavior information Ia output in living body behavior estimation step S30. Specific behavior information Iad output in specific-behavior outputting step S70 is output to information terminal 7 via communicator 80.

Specific behavior information Iad output via communicator 80 is displayed live on information terminal 7. Displaying of specific behavior information Iad on information terminal 7 enables the possessor of information terminal 7 to check the further details of the current behavior of the person inside facility 9.

In the estimation method in Embodiment 3, specific behavior information Iad is output using both device information Ie and behavior information Ia, which makes it possible to estimate the specific behavior of the person.

[3.3 Variation 1 of Embodiment 3]

Variation 1 of Embodiment 3 is described. In Variation 1 of Embodiment 3, an example in which the specific behavior of a person is estimated using fourth trained model M4 is described.

Figure 31:
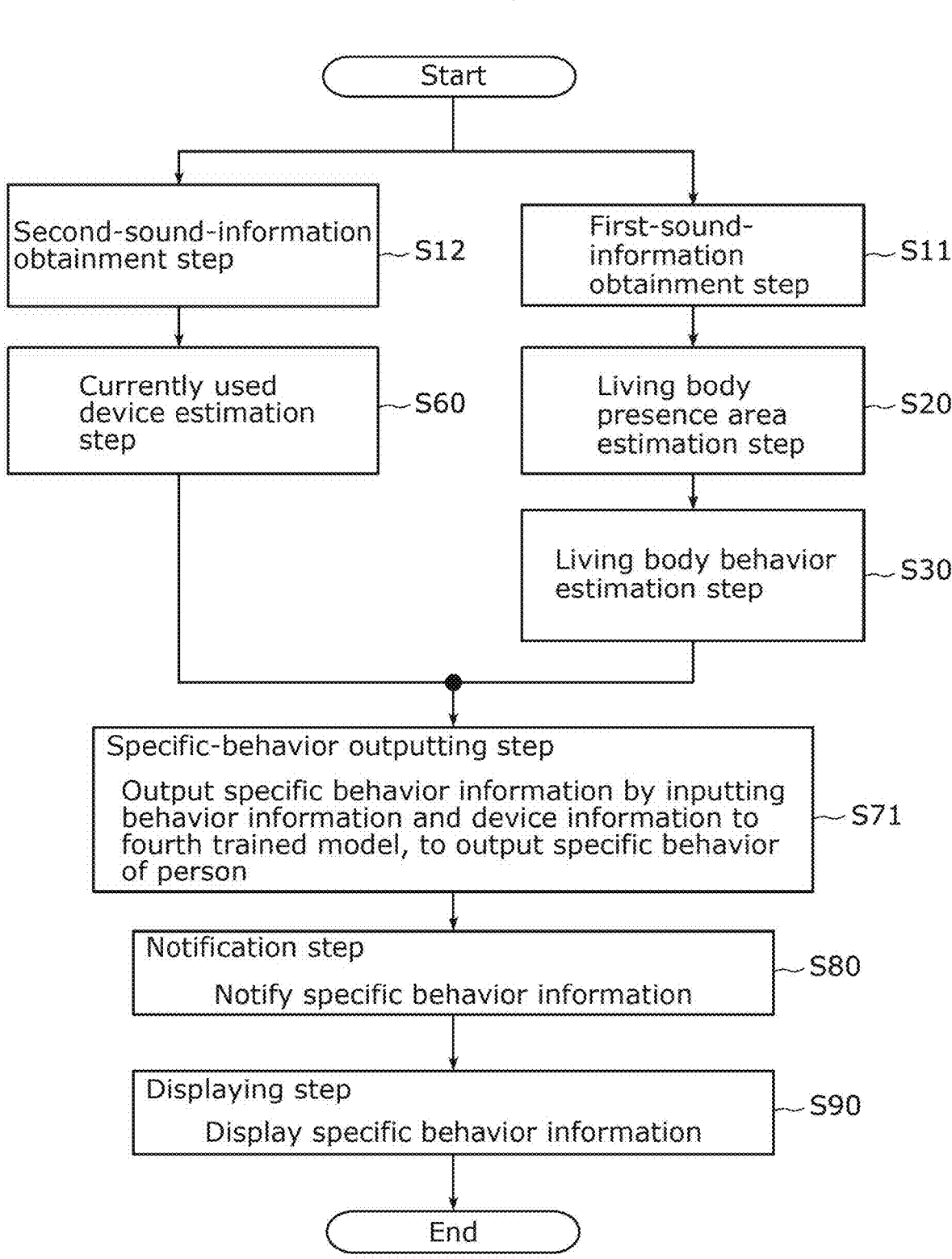
FIG. 31 is a flowchart illustrating an estimation method according to Variation 1 of Embodiment 3.

FIG. 31 is a flowchart illustrating an estimation method according to Variation 1 of Embodiment 3.

As with Embodiment 3, the estimation method in Variation 1 of Embodiment 3 includes first-sound-information obtainment step S11, living body presence area estimation step S20, living body behavior estimation step S30, second-sound-information obtainment step S12, and currently used device estimation step S60. The estimation method in Variation 1 of Embodiment 3 further includes specific-behavior outputting step S71.

In specific-behavior outputting step S71, device information Ie output in currently used device estimation step S60 and behavior information Ia output in living body behavior estimation step S30 are input to fourth trained model M4, and specific behavior information Iad indicating the specific behavior of a person is output from fourth trained model M4.

FIG. 32 illustrates fourth trained model M4 used in Variation 1 of Embodiment 3.

Fourth trained model M4 illustrated in FIG. 32 is an inference model trained using training device information Le, training behavior information La, and training specific behavior information Lad. Fourth trained model M4 is generated in advance by a computer different from behavior estimation device 4B. Furthermore, input data and training data for use in generating fourth trained model M4 are created in advance.

FIG. 33 illustrates input data and training data for use in generating fourth trained model M4.

In the example illustrated in FIG. 33, training behavior information La, which is the input data, includes meal preparation, training device information Le, which is the input data, includes microwave oven, blender, and electric kettle, and training specific behavior information Lad includes cooking ingredients, crushing and blending an ingredient, and boiling water.

Thus, fourth trained model M4 is generated by machine learning using training behavior information La, training device information Le, and training specific behavior information Lad. Fourth trained model M4 generated in advance is stored in memory 90.

In specific-behavior outputting step S71, specific behavior information Iad is output by inputting, to fourth trained model M4 generated in the above manner, device information Ie output in currently used device estimation step S60 and behavior information Ia output in living body behavior estimation step S30.

FIG. 34 illustrates examples of device information Ie and behavior information Ia input to fourth trained model M4 and an example of specific behavior information Iad output from fourth trained model M4 in specific-behavior outputter 70.

As illustrated in FIG. 34, device information Ie and behavior information Ia input to fourth trained model M4 indicate, by characters, the currently used device and the behavior of the person inside facility 9, respectively. In this respect, device information Ie and behavior information Ia are the same type of information as training behavior information La. As illustrated in FIG. 34, specific behavior information Iad output from fourth trained model M4 indicates the specific behavior of the person by characters. In this respect, specific behavior information Iad is the same type of information as training specific behavior information Lad.

Also, in estimation system 1B in Variation 1 of Embodiment 3, specific behavior information Iad is output using both device information Ie and behavior information Ia, which makes it possible to estimate the specific behavior of a person.

Embodiment 4

Estimation system 1C according to Embodiment 4 is described with reference to FIG. 35. In Embodiment 4, an example is described in which management device 6 includes the functions of behavior estimation device 4 described in Embodiment 1.

Figure 35:
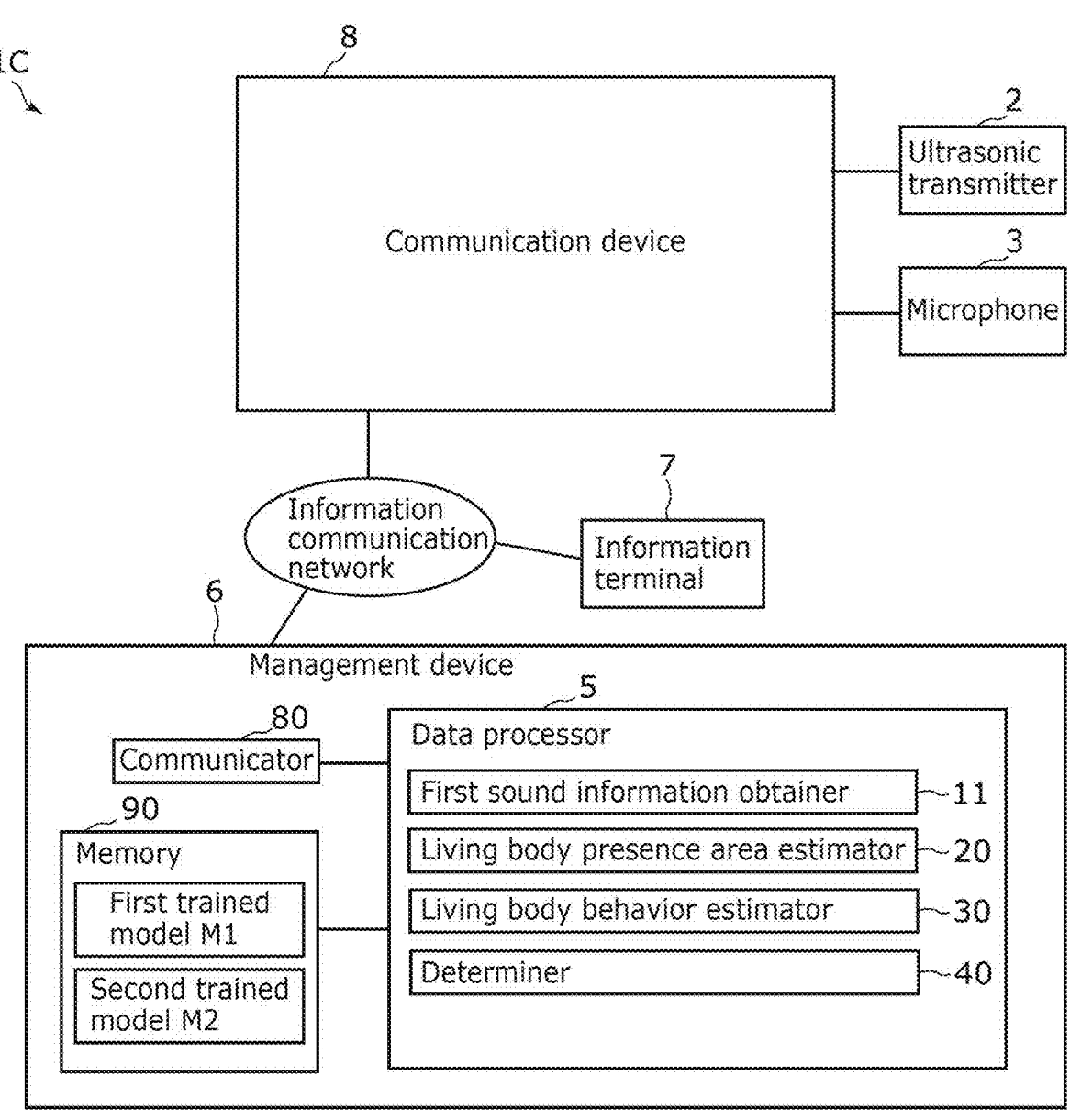
FIG. 35 is a block diagram illustrating a functional configuration of an estimation system according to Embodiment 4.

FIG. 35 is a block diagram having a functional configuration of estimation system 1C according to Embodiment 4.

As illustrated in FIG. 35, estimation system 1C includes ultrasonic transmitter 2, microphone 3, communication device 8, and management device 6.

Management device 6 is provided outside facility 9 and communicably connected to communication device 8 via an information communication network. Management device 6 is provided in a building where a security management company is located. Management device 6 in Embodiment 4 has the functions of behavior estimation device 4 described in Embodiment 1.

Ultrasonic transmitter 2, microphone 3, and communication device 8 are provided inside facility 9. Microphone 3 generates a received-sound signal by receiving a sound and outputs the received-sound signal to communication device 8. Communication device 8 is a communication module and transmits the received-sound signal to management device 6 via the information communication network.

Management device 6 receives, via communication device 8, the received-sound signal output from microphone 3.

Management device 6 includes data processor 5 including first sound information obtainer 11, living body presence area estimator 20, living body behavior estimator 30, and determiner 40. Management device 6 further includes communicator 80 and memory 90. Management device 6 is embodied as a computer including a processor. The respective structural elements of management device 6 may be, for example, software functions implemented by the processor executing a program stored in memory 90.

Management device 6 receives, via communication device 8, the received-sound signal output from microphone 3, performs data processing similar to that described in Embodiment 1, and estimates the behavior of a person.

Estimation system 1C in Embodiment 4 can also estimate the behavior of a person while protecting privacy and even when the person is not emitting a sound.

Other Embodiments

Although the estimation methods and the estimation system according to the embodiments of the present disclosure are described above, the present disclosure is not limited to the embodiments. One or more aspects of the present disclosure may include one or more embodiments achieved by making various changes envisioned by those skilled in the art to the above embodiments and one or more embodiments achieved by combining structural elements included in different embodiments, as long as such embodiments do not depart from the spirit of the present disclosure.

For instance, in behavior estimation device 4 in Embodiment 1, living body presence area estimator 20 and living body behavior estimator 30 are separate structural elements. However, the respective functions of living body presence area estimator 20 and living body behavior estimator 30 may be implemented by one structural element.

For instance, in Embodiment 1, ultrasonic transmitter 2 and microphone 3 are separate structural elements. However, this is just an example, and ultrasonic transmitter 2 and microphone 3 may be combined into an ultrasonic sensor.

Furthermore, in the above embodiments, each structural element may be implemented by executing a software program suitable for the structural element. Each structural element may be implemented by a program executer, such as a CPU or a processor, reading and executing a software program stored in a recording medium, such as a hard disk or semiconductor memory.

Furthermore, each structural element may be embodied as hardware. Each structural element may be a circuit (or an integrated circuit). Together, these circuits may form one circuit, or these circuit may be separate circuits. Furthermore, these circuits may be general-purpose circuits or dedicated circuits.

It should be noted that a general or specific aspect of the present disclosure is embodied as a system, a device, a method, an integrated circuit, a computer program, or a computer-readable recording medium, such as a CD-ROM. A general or specific aspect of the present disclosure may be embodied as any combination of the system, device, method, integrated circuit, computer program, and recording medium.

For instance, the present disclosure may be embodied as the data processor in the above embodiments and as the information processing system in the above embodiments. Furthermore, the present disclosure may be embodied as an information processing method performed by a computer such as the information processing system in the above embodiments. The present disclosure may be embodied as a program for causing a computer to execute the information processing method or a computer-readable, non-transitory recording medium on which the program is recorded.

INDUSTRIAL APPLICABILITY

The estimation method according to the present disclosure can be widely used in a system that estimates the behavior of a person and the behavior of an animal in places like a house, an apartment, a hospital, a care facility, and accommodation.

The invention claimed is:

1. An estimation method for estimating a living body inside a facility, the estimation method comprising:
    obtaining first sound information regarding a reflected sound resulted from reflection of a transmission sound in an inaudible band inside the facility;
    outputting image information indicating a living body presence area in which the living body is present, by inputting the first sound information obtained in the obtaining of the first sound information to a first trained model trained using sound information regarding the reflected sound and an image indicating the living body presence area; and
    outputting behavior information indicating a behavior of the living body inside the facility, by inputting the image information output in the outputting of the image information to a second trained model trained using the image information indicating the living body presence area and behavior information indicating a behavior of the living body.

2. The estimation method according to claim 1, wherein the first sound information includes at least one of a signal waveform of the reflected sound or an image indicating a direction from which the reflected sound is coming.

3. The estimation method according to claim 1, wherein the image information to be input to the second trained model in the outputting of the behavior information includes a plurality of image frames.

4. The estimation method according to claim 3, wherein in the outputting of the behavior information, a total number of the plurality of image frames to be input to the second trained model is determined based on a difference in a total number of pixels included in the living body presence area between two chronologically consecutive image frames out of the plurality of image frames.

5. The estimation method according to claim 3, further comprising:

selecting an image frame to be reinput to the second trained model from among the plurality of image frames, when the behavior information output in the outputting of the behavior information does not match the behavior information used when training the second trained model, wherein in the selecting, two or more image frames are selected, the two or more image frames being image frames in which a difference in a total number of pixels included in the living body presence area between two chronologically consecutive image frames out of the plurality of image frames is smaller than a predetermined threshold, and in the outputting of the behavior information, the two or more image frames selected in the selecting are reinput to the second trained model, to output the behavior information corresponding to the two or more image frames reinput.

6. The estimation method according to claim 1, further comprising:

notifying the behavior information output in the outputting of the behavior information.

7. The estimation method according to claim 6, further comprising:

displaying the behavior information notified in the notifying of the behavior information.

8. The estimation method according to claim 6, wherein when the behavior included in the behavior information is an abnormal behavior, the image information output in the outputting of the image information is further notified in the notifying of the behavior information.

9. The estimation method according to claim 8, wherein the abnormal behavior includes at least one of falling down, falling off, walking with difficulty, getting burned, or accidental swallowing.

10. The estimation method according to claim 1, further comprising:

obtaining second sound information regarding an environmental sound other than the reflected sound among environmental sounds inside the facility; and outputting device information indicating a device being used inside the facility, by inputting the second sound information obtained in the obtaining of the second sound information to a third trained model trained using sound information regarding an environmental sound other than the reflected sound and device information indicating a device that can be used inside the facility.

11. The estimation method according to claim 10, wherein the second sound information includes a spectrogram image indicating a frequency and power of the environmental sound.

12. The estimation method according to claim 10, further comprising:

determining whether a behavior of the living body is abnormal, based on the behavior information output in the outputting of the behavior information and the device information output in the outputting of the device information; and notifying the device information output in the outputting of the device information and the behavior information output in the outputting of the behavior information, when the behavior of the living body is determined to be abnormal in the determining of whether the behavior of the living body is abnormal.

13. The estimation method according to claim 12, wherein when the behavior of the living body is determined to be abnormal in the determining of whether the behavior of the living body is abnormal, the image information output in the outputting of the image information is further notified in the notifying of the device information and the behavior information.

14. The estimation method according to claim 10, wherein the second sound information includes information regarding a direction from which the environmental sound other than the reflected sound is coming, and the third trained model is generated by training using the sound information and the device information, the sound information including information regarding a direction from which the environmental sound other than the reflected sound is coming, the device information indicating the device that can be used inside the facility.

15. The estimation method according to claim 14, further comprising:

determining whether the living body is present in the direction from which the environmental sound is coming, based on the image information output in the outputting of the image information and the information regarding the direction from which the environmental sound is coming obtained in the obtaining of the second sound information, when a device included in the device information is a device that requires continuous operation by the living body to work; and outputting information indicating that the device is in abnormal use, when the living body is determined not to be present in the direction in the determining of whether the living body is present in the direction.

16. The estimation method according to claim 10, further comprising:

outputting specific behavior information in which the behavior included in the behavior information is further detailed based on the device information output in the outputting of the device information and the behavior information output in the outputting of the behavior information.

17. The estimation method according to claim 16, wherein in the outputting of the specific behavior information, the specific behavior information is output by inputting, to a fourth trained model, the device information output in the outputting of the device information and the behavior information output in the outputting of the behavior information, the fourth trained model being trained using the device information, the behavior information, and the specific behavior information.

18. An estimation system that estimates a living body inside a facility, the estimation system comprising:

a first sound information obtainer that obtains first sound information regarding a reflected sound resulted from reflection of a transmission sound in an inaudible band inside the facility;

a living body presence area estimator that outputs image information indicating a living body presence area in which the living body is present, by inputting the first sound information obtained by the first sound information obtainer to a first trained model trained using sound information regarding the reflected sound and an image indicating the living body presence area; and a living body behavior estimator that outputs behavior information indicating a behavior of the living body inside the facility, by inputting the image information output by the living body presence area estimator to a second trained model trained using the image information indicating the living body presence area and behavior information indicating a behavior of the living body.

19. The estimation system according to claim 18, further comprising:

an ultrasonic transmitter that transmits the transmission sound; and a microphone that receives the reflected sound.

20. A non-transitory computer-readable recording medium having recorded thereon a program for causing a computer to execute the estimation method according to claim 1.

\* \* \* \* \*